US008655371B2

(12) United States Patent
Huang

(10) Patent No.: US 8,655,371 B2
(45) Date of Patent: Feb. 18, 2014

(54) LOCATION DETERMINATION USING CACHED LOCATION AREA CODES

(75) Inventor: Ronald K. Huang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 695 days.

(21) Appl. No.: 12/688,805

(22) Filed: Jan. 15, 2010

(65) Prior Publication Data

US 2011/0177825 A1 Jul. 21, 2011

(51) Int. Cl.
*H04W 24/00* (2009.01)
*G05D 1/02* (2006.01)
*G01S 3/02* (2006.01)

(52) U.S. Cl.
USPC ............... 455/456.1; 455/456.5; 701/300; 701/485; 342/450

(58) Field of Classification Search
USPC ............ 455/456.1–457; 701/300, 482–485, 701/469, 573; 342/357.2–357.78, 450–463
See application file for complete search history.

(56) References Cited

U.S. PATENT DOCUMENTS

| | | |
|---|---|---|
| 5,394,158 A | 2/1995 | Chia |
| 5,412,388 A | 5/1995 | Attwood |
| 5,444,450 A | 8/1995 | Olds et al. |
| 5,493,286 A | 2/1996 | Grube et al. |
| 5,508,707 A | 4/1996 | LeBlanc et al. |
| 5,539,924 A | 7/1996 | Grube et al. |
| 5,570,412 A | 10/1996 | LeBlanc |
| 5,642,303 A | 6/1997 | Small et al. |
| 5,802,468 A * | 9/1998 | Gallant et al. ............ 455/422.1 |
| 5,913,170 A | 6/1999 | Wortham |
| 5,945,944 A | 8/1999 | Krasner |
| 5,945,948 A | 8/1999 | Buford et al. |
| 6,122,520 A | 9/2000 | Want et al. |
| 6,232,915 B1 | 5/2001 | Dean et al. |
| 6,236,861 B1 | 5/2001 | Naor et al. |
| 6,269,246 B1 * | 7/2001 | Rao et al. ................ 455/456.3 |

(Continued)

FOREIGN PATENT DOCUMENTS

| | | |
|---|---|---|
| CN | 101667208 | 3/2010 |
| EP | 1 843 524 | 10/2007 |

(Continued)

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999.

(Continued)

*Primary Examiner* — Matthew Sams
(74) *Attorney, Agent, or Firm* — Fish & Richardson P.C.

(57) ABSTRACT

Methods, program products, and systems for location determination using cached location area codes are described. A server computer can receive location information from location-aware mobile devices (e.g., GPS-enabled devices) located in a location area of a cellular communications network. The server computer can also receive from the mobile device the location area code associated with the location area in which the mobile devices are located. The server computer can estimate a coarse geographic location of the location area, as well as a number of cells encompassed by the location area using the received information. The server computer can store the estimated geographic locations associated with sufficiently large location areas (e.g., location areas having more than a certain number of cells). The server computer can provide the stored geographic locations to second mobile devices that are not GPS-enabled for estimating current locations of the second mobile devices.

21 Claims, 18 Drawing Sheets

(56) References Cited

U.S. PATENT DOCUMENTS

| | | |
|---|---|---|
| 6,321,092 B1 | 11/2001 | Fitch et al. |
| 6,363,255 B1 | 3/2002 | Kuwahara |
| 6,424,840 B1 * | 7/2002 | Fitch et al. ............... 455/456.1 |
| 6,445,937 B1 | 9/2002 | daSilva |
| 6,625,457 B1 | 9/2003 | Raith |
| 6,947,880 B2 * | 9/2005 | Johnson et al. ............... 703/2 |
| 7,072,666 B1 | 7/2006 | Kullman et al. |
| 7,076,258 B2 | 7/2006 | Motegi et al. |
| 7,120,459 B2 | 10/2006 | Sawada et al. |
| 7,127,257 B2 | 10/2006 | Riley et al. |
| 7,133,685 B2 * | 11/2006 | Hose et al. ............... 455/456.1 |
| 7,209,753 B2 | 4/2007 | Raith |
| 7,305,245 B2 | 12/2007 | Alizadeh-Shabdiz et al. |
| 7,346,359 B2 * | 3/2008 | Damarla et al. ........... 455/456.1 |
| 7,403,762 B2 | 7/2008 | Morgan et al. |
| 7,414,988 B2 | 8/2008 | Jones et al. |
| 7,433,693 B2 | 10/2008 | Sheynblat |
| 7,433,694 B2 | 10/2008 | Morgan et al. |
| 7,457,628 B2 | 11/2008 | Blumberg et al. |
| 7,471,954 B2 | 12/2008 | Brachet et al. |
| 7,474,897 B2 | 1/2009 | Morgan et al. |
| 7,478,578 B1 | 1/2009 | Kirkpatrick |
| 7,493,127 B2 * | 2/2009 | Morgan et al. ............. 455/456.5 |
| 7,502,620 B2 | 3/2009 | Morgan et al. |
| 7,515,578 B2 | 4/2009 | Alizadeh-Shabdiz et al. |
| 7,528,772 B2 | 5/2009 | Ruutu et al. |
| 7,551,579 B2 | 6/2009 | Alizadeh-Shabdiz et al. |
| 7,551,929 B2 | 6/2009 | Alizadeh-Shabdiz et al. |
| 7,576,692 B2 * | 8/2009 | Sairo et al. .................. 342/386 |
| 7,587,205 B1 * | 9/2009 | Odorfer et al. ............... 455/440 |
| 7,664,511 B2 | 2/2010 | Wang et al. |
| 7,769,396 B2 | 8/2010 | Alizadeh-Shabdiz et al. |
| 7,818,017 B2 | 10/2010 | Alizadeh-Shabdiz et al. |
| 7,974,642 B2 | 7/2011 | Lin et al. |
| 8,050,686 B1 * | 11/2011 | Souissi et al. ............... 455/456.1 |
| 8,200,251 B2 | 6/2012 | Huang |
| 2002/0067308 A1 | 6/2002 | Robertson |
| 2002/0168988 A1 | 11/2002 | Younis |
| 2003/0060213 A1 | 3/2003 | Heinonen et al. |
| 2003/0087647 A1 | 5/2003 | Hurst |
| 2004/0072577 A1 | 4/2004 | Myllymaki et al. |
| 2004/0176107 A1 | 9/2004 | Chadha |
| 2004/0203845 A1 | 10/2004 | Lal |
| 2005/0040968 A1 | 2/2005 | Damarla et al. |
| 2005/0075119 A1 | 4/2005 | Sheha et al. |
| 2005/0096084 A1 * | 5/2005 | Pohja et al. ............... 455/556.1 |
| 2005/0239478 A1 | 10/2005 | Spirito |
| 2006/0009152 A1 | 1/2006 | Millard et al. |
| 2006/0068812 A1 | 3/2006 | Carro et al. |
| 2006/0085419 A1 | 4/2006 | Rosen |
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0148466 A1 | 7/2006 | Brethereau et al. |
| 2006/0172737 A1 | 8/2006 | Hind et al. |
| 2006/0200843 A1 | 9/2006 | Morgan et al. |
| 2006/0211444 A1 | 9/2006 | Koike |
| 2006/0217130 A1 | 9/2006 | Rowitch et al. |
| 2006/0217131 A1 * | 9/2006 | Alizadeh-Shabdiz et al. ............... 455/456.1 |
| 2006/0234639 A1 * | 10/2006 | Kushwaha et al. ......... 455/67.11 |
| 2006/0240840 A1 | 10/2006 | Morgan et al. |
| 2006/0264222 A1 | 11/2006 | Cole et al. |
| 2007/0002813 A1 | 1/2007 | Tenny et al. |
| 2007/0004427 A1 * | 1/2007 | Morgan et al. ............... 455/456.1 |
| 2007/0004428 A1 | 1/2007 | Morgan et al. |
| 2007/0004454 A1 * | 1/2007 | Schweiger et al. ........... 455/558 |
| 2007/0008925 A1 | 1/2007 | Dravida et al. |
| 2007/0010261 A1 | 1/2007 | Dravida et al. |
| 2007/0066322 A1 | 3/2007 | Bahl |
| 2007/0121560 A1 | 5/2007 | Edge |
| 2007/0155307 A1 | 7/2007 | Ng et al. |
| 2007/0203647 A1 | 8/2007 | Mizouchi et al. |
| 2007/0207816 A1 | 9/2007 | Spain |
| 2007/0287473 A1 | 12/2007 | Dupray |
| 2007/0290924 A1 | 12/2007 | McCoy |
| 2008/0008117 A1 | 1/2008 | Alizadeh-Shabdiz et al. |
| 2008/0008119 A1 | 1/2008 | Alizadeh-Shabdiz et al. |
| 2008/0008120 A1 | 1/2008 | Alizadeh-Shabdiz et al. |
| 2008/0008121 A1 | 1/2008 | Alizadeh-Shabdiz et al. |
| 2008/0036661 A1 | 2/2008 | Smith et al. |
| 2008/0057955 A1 | 3/2008 | Choi-Grogan |
| 2008/0117201 A1 | 5/2008 | Martinez et al. |
| 2008/0123608 A1 | 5/2008 | Edge et al. |
| 2008/0132170 A1 | 6/2008 | Alizadeh-Shabdiz et al. |
| 2008/0139217 A1 | 6/2008 | Alizadeh-Shabdiz et al. |
| 2008/0171556 A1 | 7/2008 | Carter |
| 2008/0176583 A1 | 7/2008 | Brachet et al. |
| 2008/0186882 A1 | 8/2008 | Scherzer et al. |
| 2008/0225779 A1 | 9/2008 | Bragiel et al. |
| 2008/0259885 A1 | 10/2008 | Faulkner et al. |
| 2009/0005077 A1 | 1/2009 | Forstall et al. |
| 2009/0005080 A1 | 1/2009 | Forstall et al. |
| 2009/0005981 A1 | 1/2009 | Forstall et al. |
| 2009/0061870 A1 | 3/2009 | Finkelstein et al. |
| 2009/0067420 A1 | 3/2009 | Ganesan et al. |
| 2009/0070038 A1 | 3/2009 | Geelen et al. |
| 2009/0075672 A1 | 3/2009 | Jones et al. |
| 2009/0088183 A1 | 4/2009 | Piersol et al. |
| 2009/0132652 A1 | 5/2009 | Athale et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0181672 A1 | 7/2009 | Horn et al. |
| 2009/0227270 A1 | 9/2009 | Naaman |
| 2009/0234876 A1 | 9/2009 | Schigel et al. |
| 2009/0252138 A1 | 10/2009 | Alizadeh-Shabdiz et al. |
| 2009/0275341 A1 | 11/2009 | Monnes et al. |
| 2009/0280801 A1 | 11/2009 | Malik |
| 2009/0303112 A1 | 12/2009 | Alizadeh-Shabdiz et al. |
| 2009/0303113 A1 | 12/2009 | Alizadeh-Shabdiz et al. |
| 2009/0303114 A1 | 12/2009 | Alizadeh-Shabdiz et al. |
| 2009/0303115 A1 | 12/2009 | Alizadeh-Shabdiz et al. |
| 2009/0303119 A1 | 12/2009 | Alizadeh-Shabdiz et al. |
| 2009/0303120 A1 | 12/2009 | Alizadeh-Shabdiz et al. |
| 2009/0303121 A1 | 12/2009 | Alizadeh-Shabdiz et al. |
| 2009/0310585 A1 | 12/2009 | Alizadeh-Shabdiz et al. |
| 2009/0310658 A1 | 12/2009 | Garg et al. |
| 2009/0312035 A1 | 12/2009 | Alizadeh-Shabdiz et al. |
| 2009/0312036 A1 | 12/2009 | Alizadeh-Shabdiz et al. |
| 2010/0099438 A1 | 4/2010 | Oh |
| 2010/0156713 A1 | 6/2010 | Harper |
| 2010/0234045 A1 | 9/2010 | Karr et al. |
| 2010/0240369 A1 | 9/2010 | Law et al. |
| 2010/0255856 A1 | 10/2010 | Kansal et al. |
| 2011/0047368 A1 | 2/2011 | Sundaramurthy et al. |
| 2011/0165892 A1 | 7/2011 | Ristich et al. |
| 2011/0176494 A1 | 7/2011 | Huang et al. |
| 2011/0176523 A1 | 7/2011 | Huang et al. |
| 2011/0177826 A1 | 7/2011 | Huang et al. |
| 2011/0177831 A1 | 7/2011 | Huang |
| 2011/0177832 A1 | 7/2011 | Huang |
| 2011/0249668 A1 | 10/2011 | Milligan et al. |
| 2011/0250903 A1 | 10/2011 | Huang et al. |
| 2011/0252422 A1 | 10/2011 | Rothert et al. |
| 2011/0252423 A1 | 10/2011 | Freedman et al. |
| 2011/0252429 A1 | 10/2011 | Ballard et al. |
| 2011/0252430 A1 | 10/2011 | Chapman et al. |
| 2012/0171989 A1 | 7/2012 | Matsuo et al. |

FOREIGN PATENT DOCUMENTS

| | | |
|---|---|---|
| EP | 2 063 623 | 5/2009 |
| EP | 2 110 684 | 10/2009 |
| WO | WO 00/17803 | 3/2000 |
| WO | WO 2007/147451 | 12/2007 |
| WO | WO 2008/126959 | 10/2008 |
| WO | WO 2009/059964 | 5/2009 |
| WO | WO 2009/070138 | 6/2009 |

(56) References Cited

FOREIGN PATENT DOCUMENTS

| WO | WO 2009/089308 | 7/2009 |
|---|---|---|
| WO | WO 2010/129094 | 11/2010 |

OTHER PUBLICATIONS

"Part 16: Air Interface for Fixed Broadbank Wireless Access Systems", IEEE Std 802.16, 2004.

International Search Report and Written Opinion in PCT/US2011/021182 mailed Jun. 9, 2011, 12 pages.

International Search Report and Written Opinion in PCT/US2011/021172, mailed Apr. 5, 2011, 9 pages.

Koshima and Hoshen, "Personal locator services emerge," IEEE Spectrum, Feb. 2000, pp. 41-48.

International Preliminary Report on Patentability in PCT/US2011/021172 mailed Jul. 26, 2012, 6 pages.

International Preliminary Report on Patentability in PCT/US2010/046707 mailed Jul. 26, 2012, 9 pages.

Non-Final Office Action in U.S. Appl. No. 12/869,385 mailed Aug. 17, 2012, 27 pages.

Restriction Requirement in U.S. Appl. No. 12/869,518 mailed Jul. 25, 2012, 27 pages.

Non-Final Office Action in U.S. Appl. No. 12/869,553 mailed Jul. 13, 2012, 23 pages.

Non-Final Office Action in U.S. Appl. No. 12/869,566, mailed Sep. 28, 2012, 17 pages.

Non-Final Office Action in U.S. Appl. No. 12/959,284, mailed Oct. 24, 2012, 16 pages.

International Search Report and Written Opinion in PCT/US2010/046707 mailed Dec. 8, 2010, 12 pages.

Spratt, "An Overview of Positioning by Diffusion," Wireless Networks; The Journal of Mobile Communication, Computation and Information, 2003(9)(6):565-574.

Final Office Action in U.S. Appl. No. 12/869,553, mailed Apr. 15, 2013, 24 pages.

Examination Report in CN201010570595.6, mailed Apr. 1, 2013, 17 pages.

* cited by examiner

LOCATION DETERMINATION USING CACHED LOCATION AREA CODES

TECHNICAL FIELD

This disclosure relates generally to geographic location determination.

BACKGROUND

A cellular communications network can include a radio network made up of a number of fixed-location transceivers, also known as base stations or "cell towers." Each cell tower can serve a geographic area or a "cell." Cells of the cellular communications network can be grouped into location areas. For example, in a cellular network based on Global System for Mobile communications (GSM) technology, a location area can correspond to a group of cells sharing a Base Station Controller (BSC). Tens or hundreds of cells can share a single BSC, which can handle allocation of radio channels, receive measurements from mobile devices in the cells, and control handovers from cell to cell. The actual geographic area covered by a cell or a location area can vary, for example, between urban and rural areas, and from one cellular service provider to another. A unique number, or "location area code" (LAC), can be assigned to each location area to identify the location area.

Multiple mobile devices (e.g., cellular phones) can connect to each cell tower. If a mobile device is wirelessly connected to a cell tower, the mobile device "knows" the cell tower to which the mobile device is currently connected by an identifier of the cell tower (e.g., a cell identifier). The mobile device can also know a current LAC designating a current location area in which the mobile device is located. If the mobile device moves between cells or location areas, the cell identifier and current LAC can be updated automatically for the mobile device. The mobile device can update the current location area code without having to maintain an active wireless connection to a cell tower.

SUMMARY

Methods, program products, and systems for location determination using cached location area codes are described. A server computer can receive location information from location-aware mobile devices (e.g., GPS-enabled devices) located in a location area of a cellular communications network. The server computer can also receive from the mobile device the location area code associated with the location area in which the mobile devices are located. The server computer can estimate a coarse geographic location of the location area, as well as a number of cells encompassed by the location area using the received information. The server computer can store the estimated geographic locations associated with sufficiently large location areas (e.g., location areas having more than a certain number of cells). The server computer can provide the stored geographic locations to second mobile devices that are not GPS-enabled for estimating current locations of the second mobile devices.

Techniques of location determination using cached location area codes can be implemented to achieve the following advantages. A coarse location can be associated with a location area when the actual geography of the location area is unknown. The coarse location of the location area can be used to estimate a current location of a mobile device when the mobile device is in the location area. The estimate can be carrier-independent. The estimate can provide location information for mobile devices not equipped with GPS features.

The cached location area codes and associated coarse locations can have a small memory footprint, and can be stored on mobile devices. A mobile device that can periodically receive LAC updates from the network can quickly determine a coarse estimate of a current geographic location of the mobile devices. The determination calculation can include a simple memory lookup, and therefore can be resource efficient. For example, the calculation can also lead to less power consumption, which can help avoid frequent charging of the mobile device battery and therefore enhance a user's experience using the mobile device. The mobile device can improve the coarse estimate upon request.

For GPS-enabled mobile devices, estimating a coarse location using the geographic area associated with a LAC can be advantageous when, for example, GPS signals are weak (e.g., inside buildings). On a GPS-enabled mobile device, the geographic area associated with a LAC can be used to provide an almost instantaneous location estimate of the mobile device. For example, when the mobile device is turned on and before the mobile device determines a location based on the GPS signals, an estimated location based on a location area in which the mobile device is located can be displayed.

The coarse location estimate can be improved on an as-needed basis. If a user of the mobile device requires more accurate location than the coarse location associated with a LAC, the mobile device can determine a current location based on available wireless (e.g., WiFi) connections, even if the mobile device is not equipped with GPS features or when GPS signals are weak.

The details of one or more implementations of location determination using cached LACs are set forth in the accompanying drawings and the description below. Other features, aspects, and advantages of adaptive location determination will become apparent from the description, the drawings, and the claims.

BRIEF DESCRIPTION OF THE DRAWINGS

Like reference symbols in the various drawings indicate like elements.

DETAILED DESCRIPTION

Overview of Location Determination Using Cached Location Area Codes

Figure 1:
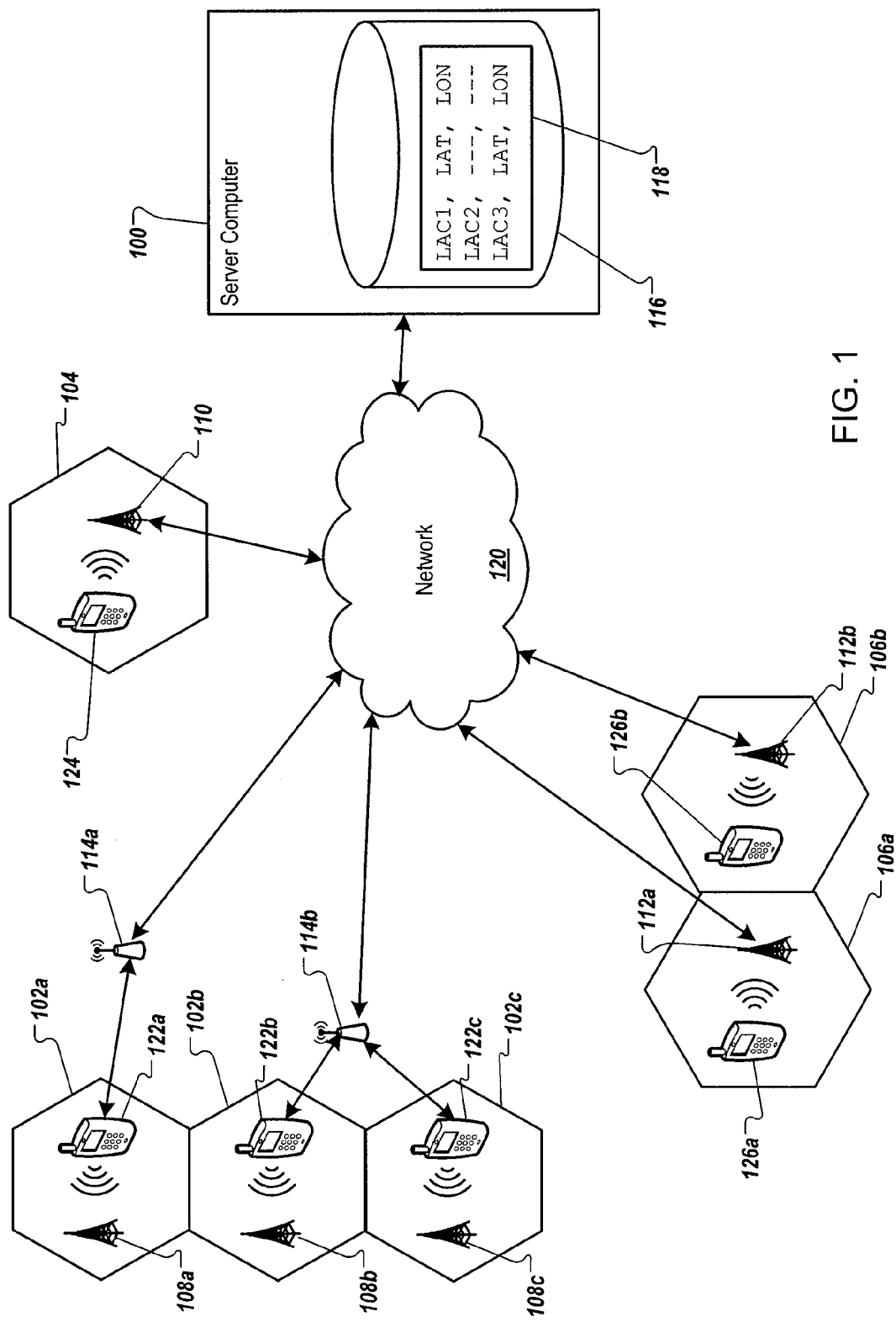
FIG. 1 is an overview of techniques of location determination using cached location area codes.

FIG. 1 is an overview of techniques of location determination using cached location area codes. For convenience, the techniques will be described in reference to a system that implements the techniques of location determination using cached location area codes.

The system can include server computer 100 connected to network 120. Network 120 can be a data communications network (e.g., a packet switching network) or a hybrid of data and voice network. Through network 120, server computer 100 can communicate with various devices that are connected to network 120, including mobile devices 122, 124, and 126.

Mobile devices 122, 124, and 126 can be location-aware mobile devices that can be connected to one or more cellular communications networks. The cellular communications networks can each include one or more location areas. The system can determine a coarse location to be associated with each location area using current locations of mobile devices 122, 124, and 126. The current locations of mobile devices 122, 124, and 126 can be determined using various technologies implemented on mobile devices 122, 124, and 126. For example, mobile device 102a can determine a current location of mobile device 102a using Global Positioning System (GPS) signals received though a GPS receiver that is built in or coupled to mobile device 102a.

Each of mobile devices 122, 124, and 126 can be served by a cell tower of the cellular communication network. For example, mobile devices 122a-c can be served by cell towers 108a-c, respectively; mobile device 104 can be served by cell tower 110; and mobile devices 126a and 126b can be served by cell towers 112a and 112b, respectively. In some implementations, a BSC can determine which mobile device can be served by which tower based on channel availability and geographic locations.

Cells 102, 104, and 106 can be grouped into one or more location areas (e.g., based on one or more BSC that control cell towers 122, 124, and 126 of the cells). For example, cells 102a-c can be grouped into a first location area; cell 104 can belong to a second location area that includes a single cell; and cells 106a and 106b can be grouped into a third location area. Each cellular service provider can define location areas specific to the service provider. For example, some location areas can be groups of one or two cells, while some location areas can include hundreds of cells. Each cell can cover a geographic area that can be, for example, several square kilometers. A location area can encompass a geographic area that is covered by the cells in the location area.

Each location area of the cellular communications network can be associated with a location area code (LAC). The LAC can uniquely identify the location area. The LAC can be a string or a numeric value. For example, in a Public Land Mobile Network, a LAC can have a value range from 0 to 65,535. Location update procedure can allow a mobile device (e.g., mobile device 122a) to inform the cellular communications network when mobile device 122a moves from one location area (e.g., the first location area that includes cells 102a-c) to another (e.g., the second location area that includes cell 104). In some implementations, a mobile device can be responsible for detecting and maintaining location area codes of the location where the mobile device is currently located. For example, when mobile device 102a finds that a current LAC is different from LAC of last update, device 102a can perform another update by sending to the network a location update request. In some implementations, when mobile device 102a moves from one location area to a next while not on a call, a random location update can be performed. The random location update can also occur when signal fades.

Each cell tower (e.g., cell tower 108a) can have a unique identifier (cell ID) associated with the cell tower. A mobile device (e.g., mobile device 122a) located within a cell (e.g., cell 102a) can acquire the cell ID of the cell tower (e.g., cell tower 108a) that serves the cell. For example, when mobile device 122a initiates a data or voice communication through cell tower 108a, mobile device 122a can identify the cell ID of cell tower 108a.

A program running on mobile device 102a can acquire the current LAC and cell ID for mobile device 102a. The program can cause mobile device 102a to transmit the current LAC, the current cell ID, and the current location of mobile device 102a to server computer 100 through network 120. The program can be configured such that the transmissions occur at a certain time (e.g., when a user finishes a phone conversation and "hangs up" mobile device 102a, or when the user terminates a data communication session).

In some implementations, the transmissions from mobile devices 122, 124, and 126 to server computer 100 can be received through the cell towers. For example, mobile device 126a can transmit the current LAC of mobile device 126a, current cell ID (e.g., cell ID of cell 106a), and current location of mobile device 126a to server computer 100 through cell tower 112a and network 120. Cell tower 112a can be connected to network 120 though one or more gateways. In some implementations, the transmissions from mobile devices 122 to server computer 100 can occur through wireless access points 114a and 114b of a wireless communications network, which can be distinct from the cellular communications network. An exemplary wireless communications network can be a Wireless Local Area Network (WLAN). For example, mobile devices 122a-122c can store locations associated with the current LAC and current cell IDs in a cache memory device, and transmit the stored locations, LAC, and cell IDs to server computer 100 when access points 114a or 114b become available to mobile devices 122a-122c.

Upon receiving the information (including LACs, cell IDs, and location coordinates) from mobile devices 122, 124, and 126, server computer 100 can store the information in a temporary database. After a time period (e.g., a day, or a week) where a statistically significant amount of data has been received, server computer 100 can select from the temporary database certain LACs whose location areas each includes a large enough number of cells. The selected LACs can be used in further computation. The number of cells in each location area can be calculated using a number of distinct cell IDs associated with a single LAC in the received information. Server computer 100 can select those LACs that are associated with a number of distinct cell IDs when the number reaches a threshold (e.g., 30).

For each selected LAC, server computer 100 can calculate an estimated geographic area to be associated with the LAC based on the locations received from mobile devices 122, 124, and 126. In this specification, the term "LAC location" will be used to refer to the estimated geographic area to be associated with a LAC. The LAC location can be a coarse location that corresponds to the location area represented by the LAC. The coarse location can be represented as a circle, whose center can be defined by a latitude and a longitude, and whose radius can correspond to an uncertainty radius. The uncertainty radius can represent a probability that a certain percentage of mobile devices (e.g., 95 percent) are located within the radius. The LAC location associated with a particular LAC does not necessarily match the geographic shape or location of the location area identified by the particular LAC. The LACs and corresponding LAC locations can be stored as location records 118 in LAC location database 116.

For example, location records 118 can include three exemplary LACs. "LAC1" can represent a location area that includes three cells (cells 102a-c). "LAC2" can represent a location area that includes one cell (cell 104). "LAC3" can represent a location area that includes two cells (cells 106a-b). When the threshold for selecting location areas is set (e.g., set to two), coarse locations can be calculated for LACs that are associated with two or more cells. Therefore, in a two-cell threshold scenario, the locations for "LAC1" and "LAC3" can be calculated, whereas the location for "LAC2" can be excluded from the calculation. The latitudes, longitudes, and uncertainty radius of "LAC1" and "LAC3" can be included in records 118.

Server computer 100 can send records 118 to one or more mobile devices (e.g., mobile device 126b). In some implementations, records 118 can be programmed into mobile device 126b when mobile device 126b is shipped to a user (e.g., a cellular service subscriber). Programming records 118 into mobile device 126b can occur when mobile device 126b leaves a manufacturer. Programming records 118 into mobile device 126b can also occur when mobile device 126b is initialized (e.g., at a retail store when mobile device 126b is purchased). Programming records 118 into mobile device 126b can also occur dynamically (e.g., when the subscriber downloads an application program into mobile device 126b). Records 118, once stored on mobile device 126b, can be updated periodically, upon request, or when necessary, using various wireless or wired, pull or push, automatic or manual updating technologies through network 120 and cell tower 112b. Records 118, stored on mobile device 126b, can be used to estimate a coarse current location of mobile device 126b when mobile device 126b knows a current LAC.

Figure 2A:
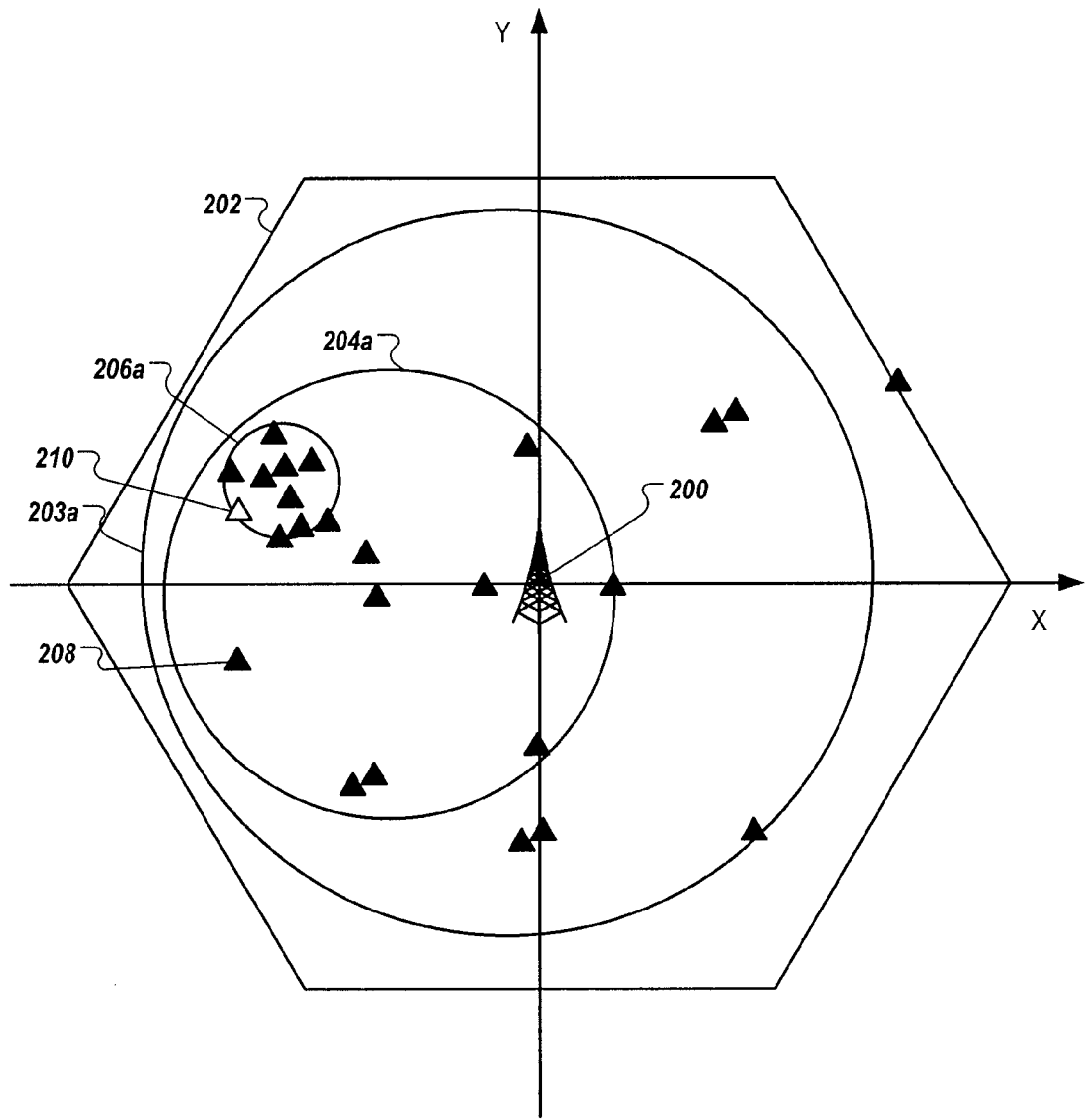
FIG. 2A illustrates adaptive location determination techniques for associating a coarse location with a LAC.

FIG. 2A illustrates adaptive location determination techniques for associating a coarse location with a LAC. For convenience, the techniques will be described in reference to a system that implements the techniques of locating cells of a cellular communications network using mobile devices.

A cellular communications network can be a radio network that includes a number of cells. A cell can be an area served by one or more cell towers. In FIGS. 2A-2E, cell 202 is served by cell tower 200. Mobile devices 208 located within the cell can communicate with each other or with other devices (e.g., data servers or landline phones) inside or outside cell 202 through cell tower 200 that serves the cell. Cell 202 can be an area defined by one or more geographic boundaries that are determined by, for example, communication ranges of cell tower 200 and cell towers in neighboring cells. Mobile devices 208 can enter cell 202 when, for example, mobile device 208 switches cell towers to which mobile device 208 was connected to cell tower 200.

Each of mobile devices 208 and other mobile devices represented in FIGS. 1-3 as a black triangle can be a location-aware device that can determine a current location using various technologies (e.g., GPS). Mobile device 110, which is represented as a white triangle, can be a non-GPS-enabled mobile device that is not equipped with hardware components that allow the mobile device to determine its current geographic location. X and Y axes of FIG. 1 are shown to illustrate that locations of mobile devices 208 can be determined on a two-dimensional area defined by axes X and Y. For example, X and Y axes can correspond to longitudes and latitudes, respectively. For convenience, location of cell tower 200 is shown to coincide with point zero on the X and Y axes in FIG. 1. In some implementations, an actual location (e.g., latitude and longitude coordinates) of cell tower 200 is optional in the calculations.

When mobile devices 208 communicate with cell tower 200, mobile devices 208 can transmit location information to the system through cell tower 200. The location information can be associated with a current LAC and an identifier of cell 202 (e.g., cell ID of cell 202). The system can use the location information transmitted from multiple mobile devices 208 to determine an estimated geographic area that can be associated with the cell or the LAC. The estimated geographic area does not necessarily enclose a point where cell tower 200 is actually located. Neither is it necessary for the estimated geographic area to correspond to the geometric location or shape of cell 202 or the current location area, although the estimated geographic area can be located within cell 202 and the current location area. The estimated geographic area can correspond to an area where mobile devices (including location-aware devices 208 and non-GPS-enabled device 210) are likely to be located when the mobile devices are in cell 202 and the current location area. The estimated geographic area can be used to determine a coarse location of mobile device 210.

The system that has received multiple locations transmitted from mobile device 208 can determine the estimated geographic area using an iterative process (e.g., by performing a multi-pass analysis). In some implementations, the system can initially calculate an average geographic location (e.g., a centroid) using a set that contains locations received from mobile devices 208 that are located in cell 202 that is served by cell tower 200. In some implementations, the system can use a set that contains locations received from mobile devices 208 that have the same LAC. In each pass of the multi-pass analysis, the system can calculate a new average geographic location based on the locations in the set, calculate a distance between the average geographic location and each location in the set, and exclude from the set one or more outliers. Outliers can be locations in the set that are located the farthest from the average geographic location. The system can repeat the multi-pass analysis until an exit condition is satisfied (e.g., after a certain number of passes have run, or when other exist conditions are satisfied).

For example, in various passes of the multi-pass analysis, the estimated geographic area can be circles 203a, 204a, and 206a, respectively. Centers of circles 203a, 204a, and 206a can each correspond to an average geographic location of the locations in the set in a distinct stage (e.g., a pass of the multi-pass analysis). In each pass, the set of locations can be reduced by excluding the outliers. A location can be excluded from the set if the distance between the location and an average geographic location exceeds a threshold.

In some implementations, radii of circles 203a, 204a, and 206a can each represent an estimated error margin of the geographic areas. The smaller the radius, the more the precision of the estimated geographic location. Each of the radii of a circle 203a, 204a, and 206a can be determined based on at least one calculated distance between the average geographic location and each location in the set. The error margin can correspond to a probability that a mobile device's current location is correctly estimated.

The multi-pass analysis can result in a final average geographic location (e.g., center of circle 206a) and a final estimated error margin (e.g., radius of circle 206a) when the exit condition is satisfied. The final estimated error margin can be defined based on distances (e.g., a longest distance) between the final average geographic location and locations remaining in the set. Circle 206a can be associated with cell 202 and used for estimating locations of non-GPS-enabled mobile devices (e.g., mobile device 210) connected to cell tower 200.

Once locations of individual cells included in a location area is determined, the LAC location can be similarly calculated by applying the iterative process on the estimated locations of the cells included in the location area. In some implementations, the location representing the LAC can be directly calculated using the locations from mobile devices 208.

Figure 2B:
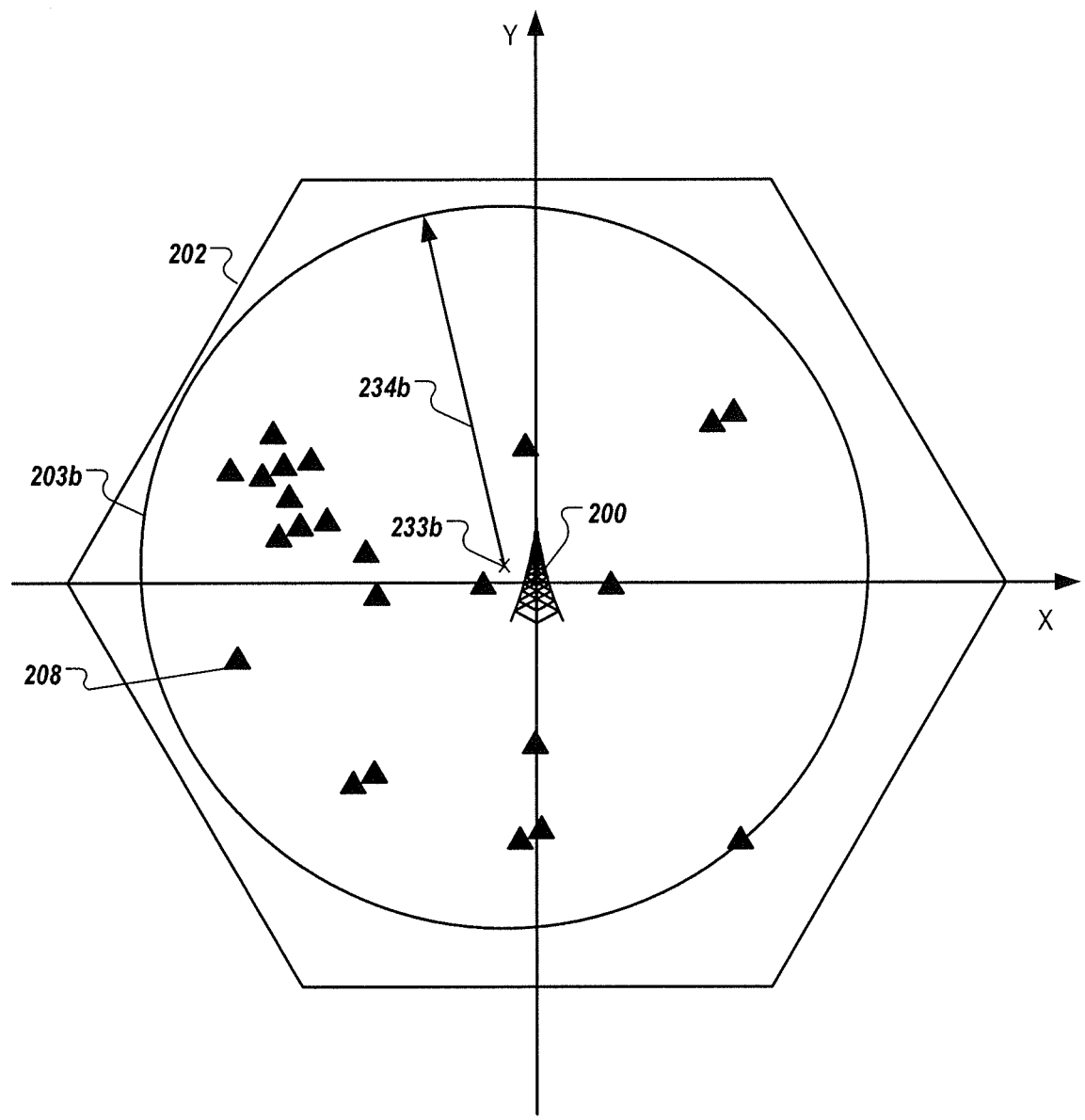
FIGS. 2B-2D illustrate exemplary stages of using adaptive location determination techniques to associate a coarse location with a LAC.
Figure 2C:
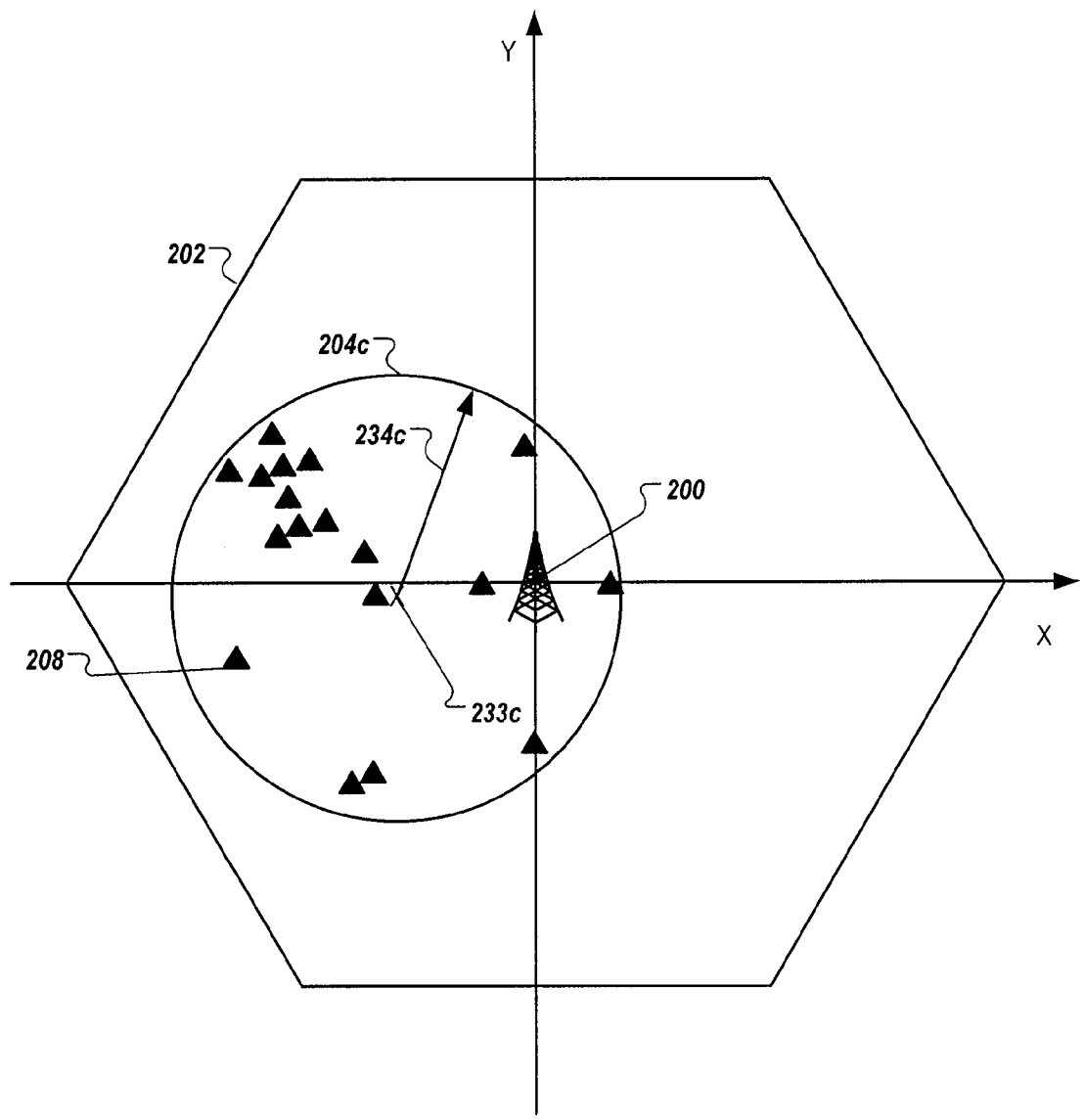
Figure 2D:
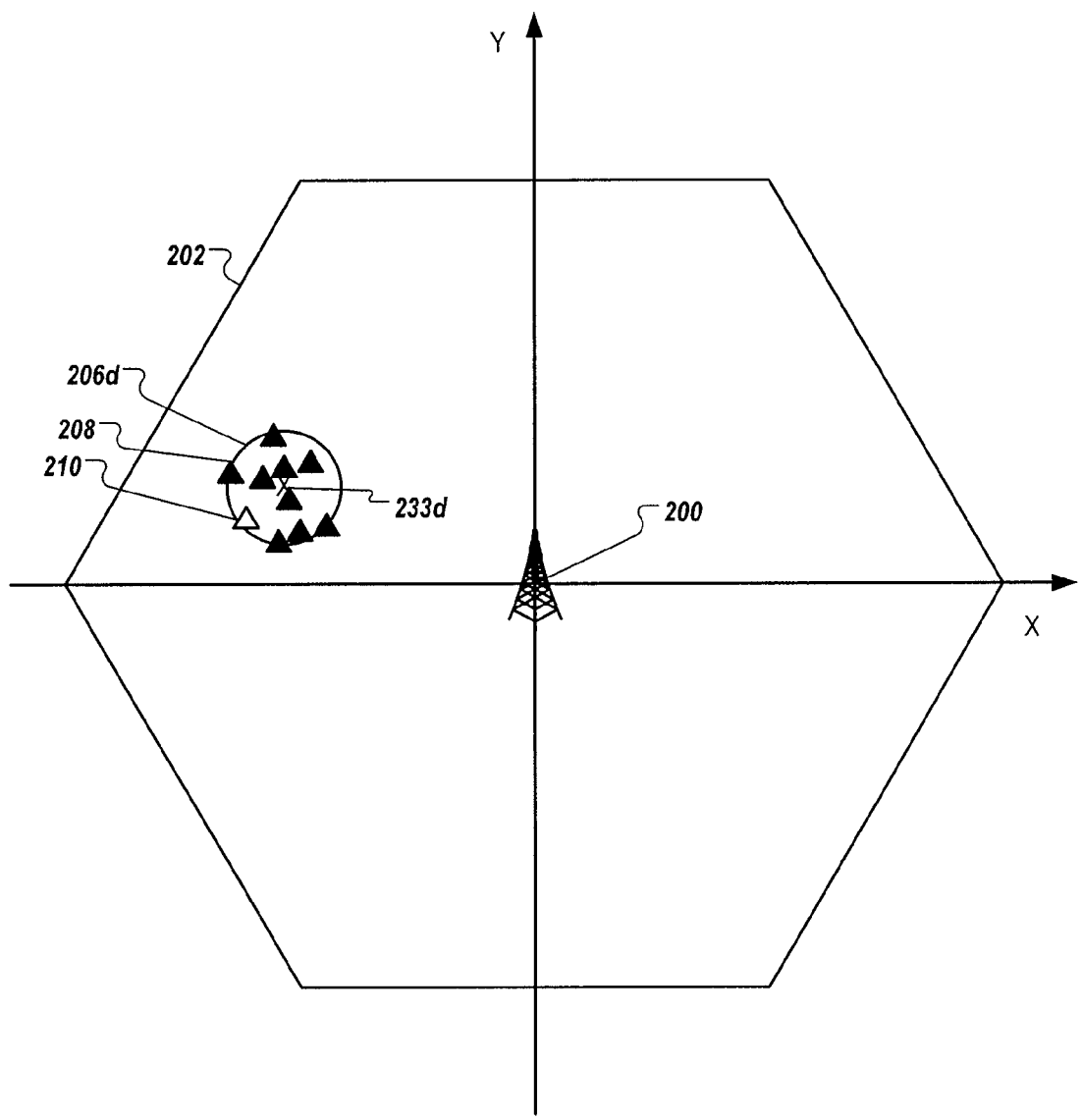

FIGS. 2B-2D illustrate exemplary stages of using adaptive location determination techniques to associate a coarse location with a LAC. For convenience, the techniques will be described in reference to a system that implements the techniques, cell 202 of the cellular communications network and mobile devices 208 as shown in FIG. 1.

FIG. 2B illustrates a stage of a multi-pass analysis for calculating an average location. Each black triangle of FIG. 2B can represent a mobile device (e.g., mobile device 208) located in cell 202. Each mobile device 208 can be associated with a current location of mobile device 208. The current location can be represented by geographic coordinates that include a latitude and a longitude of mobile device 208.

Distribution of mobile devices 208 can reflect a snapshot of mobile devices 208 at a particular time (e.g., 8:30 am local time for a time zone in which cell 202 is located) or locations of mobile devices 208 over a period of time (e.g., six hours). In the former case, each mobile device 208 can be associated with a single location. In the latter case, each mobile device 208 can be associated with multiple locations (e.g., when mobile device 208 is moving). Mobile device 208 that is associated with multiple locations can be represented by multiple locations in FIG. 2B.

For example, mobile device 208 can be a location-aware mobile telephone. If a person is using the location-aware mobile telephone while moving (e.g., walking, driving, etc.), the mobile telephone can have a distinct location every minute. In some implementations, the mobile telephone can transmit the location to the system periodically (e.g., every minute) through cell tower 200. In some implementations, the mobile telephone can cache (e.g., record) the locations periodically (e.g., every minute), and transmit the cached locations when sufficient bandwidths exist such that the transmission does not interfere with performance of the mobile telephone (e.g., when the person finishes talking and hangs up). Each distinct location can be represented as a distinct black triangle in FIG. 2B. The data transmitted to the system do not need to include privacy information that may be linked to a user of mobile device. For example, a user account name and telephone number need not be transmitted.

The system can determine an average geographic location of a set of locations received from mobile devices 208. The set of locations can include locations received from mobile devices 208 at a particular time or during a particular time period. The average geographic location can be designated as center 233b of area encompassed by circle 203b. Center 233b of circle 203b need not coincide with the location of cell tower 200. A distance between the average geographic location and each location in the set can be calculated. Locations whose distances to the center exceed a threshold can be excluded from the set. Circle 203b can have radius 234b that is calculated based on the longest distance between the average geographic location and locations in a current set.

FIG. 2C illustrates another stage of the multi-pass analysis subsequent to the stage of FIG. 2B. Locations whose distances to the average geographic location of FIG. 2B (center 233b of circle 203b) exceed a threshold are excluded from the set. The threshold can be configured such that a percentage of locations (e.g., five percent of locations of FIG. 2B) are excluded. A new average geographic location can be calculated based on the locations remaining in the set (e.g., the 95 percent of locations remaining). The new average geographic location can be, for example, center 233c of circle 204c. In various implementations, calculating the new average geographic location can include averaging the remaining locations in the set, selecting a medium geographic location in the set (e.g., by selecting a medium latitude or a medium longitude), or applying other algorithms. Algorithms for calculating the average geographic location can be identical in each pass of the multi-pass analysis, or be distinct from each other in each pass.

Area encompassed by circle 204c can be smaller than the area encompassed by circle 203b as determined in a prior pass when outlier locations are excluded. The smaller area can reflect an increased precision of the calculation. Center 233c of circle 204c does not necessarily coincide with center 233b of circle 203b. In some implementations, radius 234c of circle 204c can correspond to a remaining location of mobile device 208 that is farthest away from the center 233c of circle 204c. The radius can represent an error margin of the new estimated geographic location calculated in the current pass.

FIG. 2D illustrates an exemplary final stage of the multi-pass analysis. The final pass can produce a final average geographic location that corresponds to a cluster of positions of mobile devices 208. The final average geographic location can be designated as center 233d of circle 206d. Circle 206d can have a radius that corresponds to a final error margin, which is based on a distance between the final average geographic location and a location in the cluster. Circle 206d can represent a geographic area in which a mobile device in cell 202 is most likely located based on the multi-pass analysis.

Once a geographic area is calculated for each individual cell of a location area, the LAC location of the location area can be calculated based on the individual cells. Calculating the LAC location can include applying the multi-pass algorithm to a set of locations associated with the cells including cell 202.

Figure 2E:
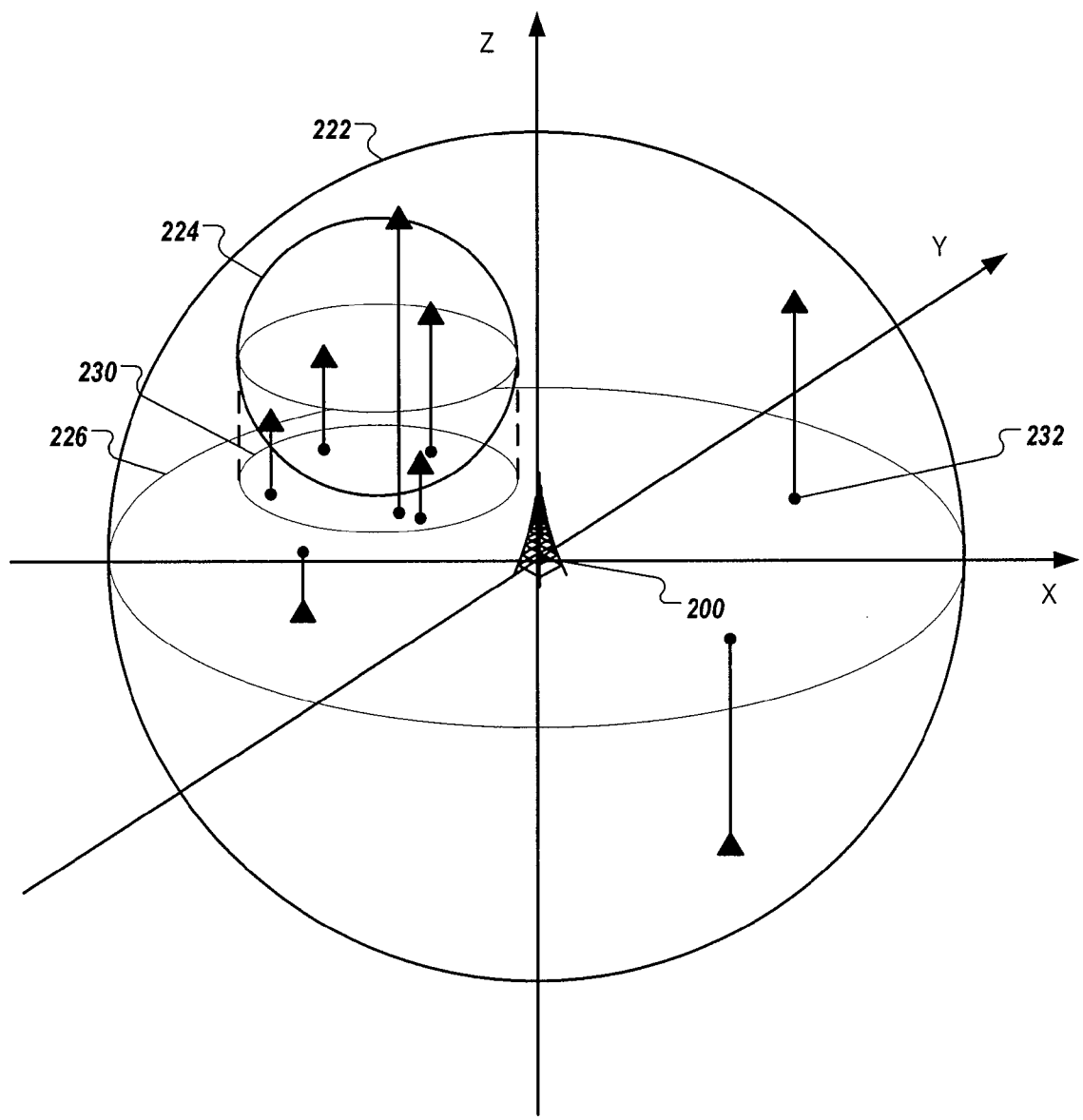
FIG. 2E illustrates adaptive location determination techniques for associating a coarse location with a LAC in a three dimensional space.

FIG. 2E illustrates an exemplary stage of location determination using cached location area codes in a three-dimensional space. Some location-aware mobile devices 208 (e.g., GPS-enabled devices) can identify locations in three-dimensional space. The locations can be represented by latitudes, longitudes, and altitudes. Locating a mobile device in a three-dimensional space can be desirable when an altitude of the mobile device is necessary for locating the mobile device. For example, it can be desirable to determine on which floor the mobile device is located in a high-rise building.

In FIG. 2E, axes X, Y, and Z can be used to indicate a three-dimensional space. For example, axes X, Y, and Z can represent longitude, latitude, and altitude, respectively. For convenience, location of cell tower 200 is shown to coincide with point zero on the X, Y, and Z axes in FIG. 2E. In some implementations, an actual location (e.g., latitude, longitude, and altitude coordinates) of cell tower 200 is optional in the calculations.

Each triangle of FIG. 2E can represent a location of a device located in a three-dimensional cell space 222. The locations can have projections (e.g., projection 232) on a plane in the three-dimensional space. The plane can be defined at an arbitrary altitude (e.g., the altitude of cell tower 200). Cell space 222 can intersect with the plane at circle 226. Projection 232 and intersection circle 226 are shown to illustrate the locations of mobile devices 208. In some implementations, determining the projections and intersections can be optional in the calculations.

A multi-pass analysis can associate a geographic space with cell space 222 of a cellular communications network based on a set of locations received from location-aware mobile devices 208 that are located in cell space 222. In a pass of the multi-path analysis, an average geographic location (e.g., center of space 224) can be determined by, for example, averaging the latitudes, longitudes, and altitudes coordinates of locations in the set. Distances between the average geographic location and locations in cell space 222 can be calculated. Locations that are within cell space 222 but are sufficiently far away from the average geographic location can be excluded from the set and from further computations. A radius of sphere 224 can be determined by, for example, the farthest distance between remaining locations in the set and the average geographic location. Circle 230 illustrates projection of the space encompassed by sphere 224 on the plane.

The system can repeat the stages of calculating an average geographic location in a set, calculating distances between the average geographic location and the locations in the set, and excluding from the set locations based on the calculated distances. The repetition can continue until an exit condition is satisfied. A space having a center at the average geographic location and a radius that is based on a distance between the average geographic location and a remaining location in the set can be designated as a geographic space that can be associated with the cell space 222. For convenience, the space enclosed by the sphere having a center at the average geographic location and a radius that is based on a distance between the average geographic location and a remaining location in the set will be referred to as a presence space in this specification. The presence space can indicate a space in which a mobile device (e.g., mobile device 110) is likely to be located when the mobile device is in cell space 222 (e.g., when the mobile device is served by cell tower 200).

Once locations of cells included in a location area is determined, the location representing the LAC can be similarly calculated by applying the iterative process on the estimated locations of the cells included in the location area. In some implementations, the location representing the LAC can be directly calculated using the locations from mobile devices 208.

Exemplary Location Determination Using Cached LAC

Figure 3A:
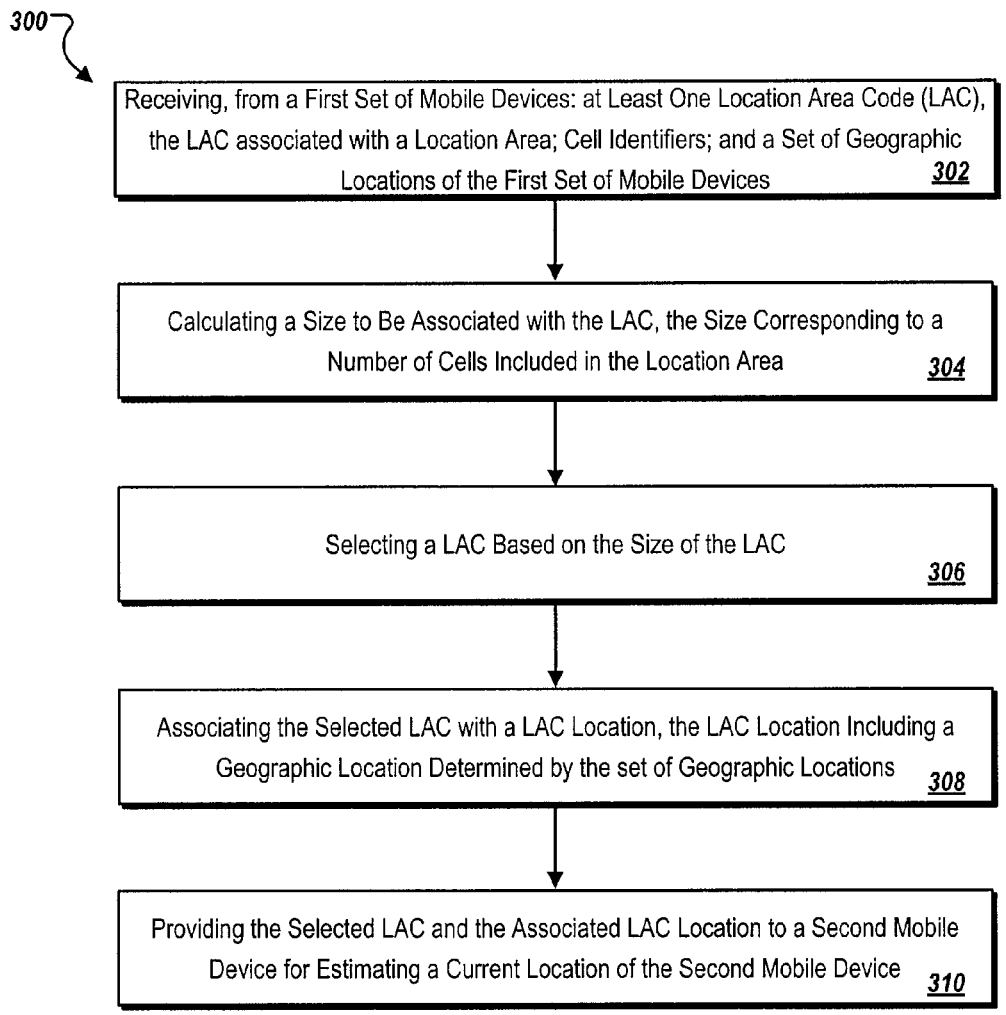
FIGS. 3A and 3B are flowcharts illustrating exemplary processes of location determination using cached location area codes.

FIG. 3A is a flowchart illustrating exemplary process 300 of location determination using cached location area code. Process 300 can be used, for example, to determine a coarse location (e.g., LAC location) associated with a location area of a cellular communications network. The LAC location associated with a location area of a cellular communications network can be used to determine a location of a non-GPS-enabled mobile device. For convenience, process 300 will be described in reference to a system that implements process 300 and location-aware mobile devices 208.

The system can receive (302), from a first set of mobile devices 208, the following information: at least one location area code (LAC) of a cellular communications network, the LAC associated with a location area; cell identifiers of the cellular communication network; and a set geographic locations of the first set of mobile devices from one or more mobile devices 208. Each location can be represented by geographic coordinates (e.g., latitude, longitude, and altitude). In various implementations, the set of locations can correspond to a period of time (e.g., 6 hours, or from 6 am to 10 am of a time zone in which the location area is located).

In some implementations, the period of time can be configured to reflect characteristics of specific usage patterns at various hours of a day. An area where mobile devices are most likely located in the location area can vary during the day, indicating various usage patterns in specific hours. For example, the period of time can correspond to "commute time," "business hours," "night time," etc. The characteristics of the time of the day can correspond to various usage patterns of mobile devices 208. For example, during commute time, mobile devices in the location area can be at or near a freeway; during business hours, the mobile devices in the location area can be at or near an office building; at nighttime, the mobile devices in the location area can spread out without a particular point of concentration. The system can calculate the LAC location based on locations received, for example, from 4 am to 10 am, and recalculate the LAC location based on location received from 10 am to 4 pm, etc. Locations received in each characteristic time period can be grouped into a set in the system. The locations can be stored in any data structure (e.g., set, list, array, data records in a relational database, etc.) on a storage device coupled to the system.

The system can calculate (304) a size to be associated with the LAC. The size to be associated with the LAC can correspond to (e.g., can measure) a number of cells in the location area represented by the LAC. Calculating the size can include examining a number of distinct cell IDs associated with the LAC, based on the information received from mobile devices 208.

The system can select (306) a LAC based on the calculated size of the LAC. Selecting an LAC can include specifying a size threshold (e.g., 30 cells), and selecting the LAC whose size reaches or exceeds the threshold (e.g., the LACs whose represented location areas include at least 30 cells). In some implementations, selecting a LAC can include ranking the LACs based on the size of the LACs (e.g., the LACs whose represented location areas include the most number of cells can rank the highest) and selecting a number of LACs that are top-ranked (e.g., the top 50,000 LACs).

The system can associate (308) each of the selected LACs with a LAC location. A LAC location may or may not coincide with the actual geographic area of the location area as defined by the cellular service provider. The LAC location may or may not coincide with the cells included in the location area. The actual geographic area of the location area and the cells can be unknown. The LAC location can include a geographic location determined by the set of geographic locations received from mobile devices 208. The LAC location can be stored on a storage device in association with the LAC.

Further details on determining the LAC location will be described below with respect to FIG. 3B.

The system can provide (310) the selected LAC and the associated LAC location to a second mobile device (e.g., mobile device 210) for estimating a current location of the second mobile device. Providing the selected LAC and the associated LAC location to mobile device 210 can include sending the selected LAC and the associated LAC location to mobile device 210 wirelessly.

Figure 3B:
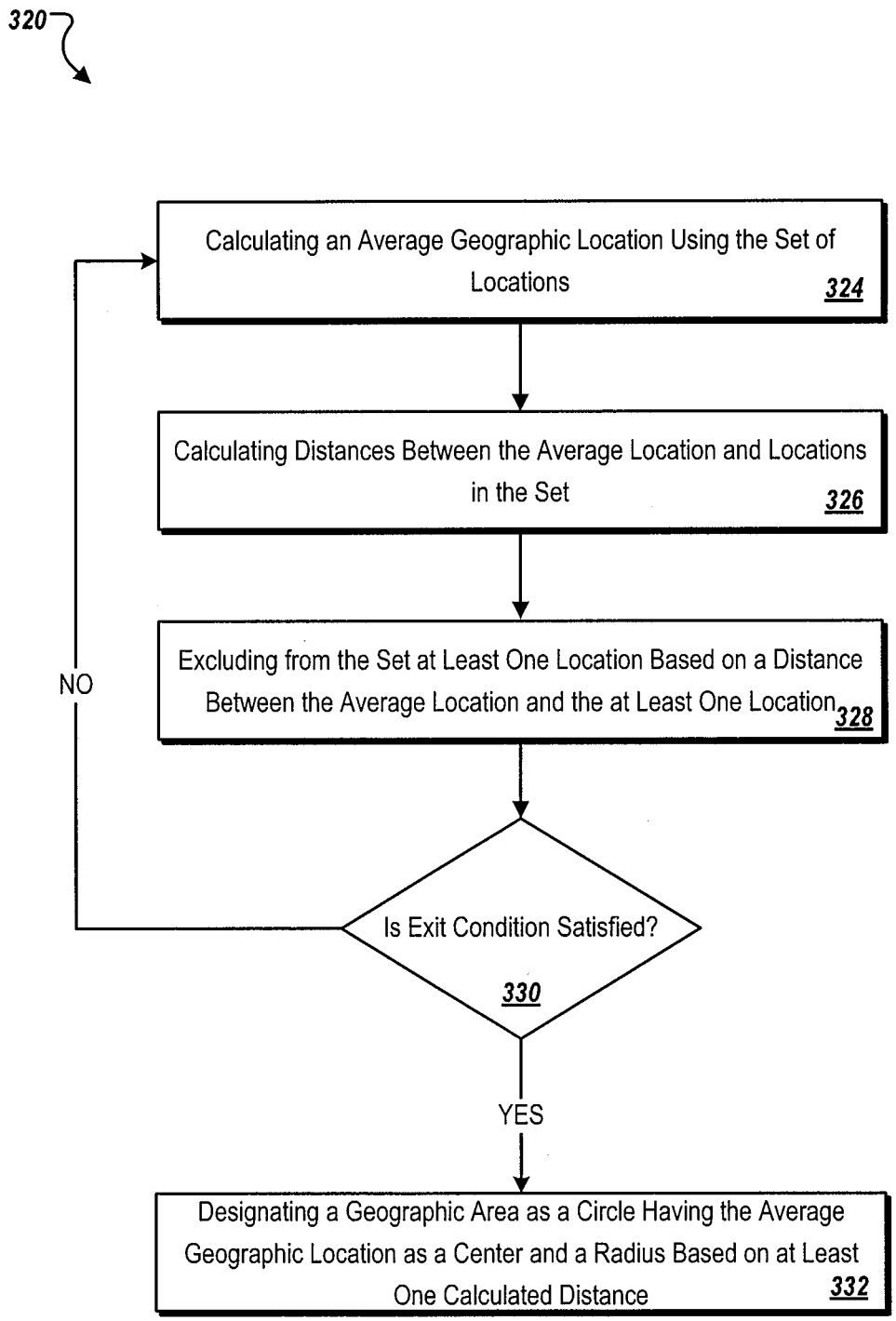

FIG. 3B is a flowchart illustrating an exemplary process 320 of calculating a LAC location using a set of locations. For convenience, process 320 will be described in reference to a system that implements process 320.

The system can calculate (324) an average geographic location using the locations in the set of locations received from mobile devices 208. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a position at a median latitude, median longitude, and median altitude of the positions in the set as the average geographic location.

The system can calculate (326) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the Earth into consideration.

The distances calculated in stage 326 can be designated as a radius associated with a center. The center can be the average geographic location calculated in stage 324, which can be a center of a circle. The radius of the circle can be determined based on at least one distance between a location in the set of locations and the average geographic location. In some implementations, the radius can equal to the longest distance between the average geographic location and a location remaining in the set. In some implementations, the radius can be a distance that, when the circle is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

The system can exclude (328) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating the LAC location associated with the LAC, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 250 meters for the first pass, 150 meters for the second pass, etc.). The system can exclude at least one location from the set when the distance between the average geographic location and the location exceeds the threshold distance.

The system can repeat stages 324, 326, and 328 of process 320 until an exit condition is satisfied. The system can determine (330) whether an exit condition is satisfied for terminating the repetition. In some implementations, the exit condition can be satisfied when a number of repetitions reach a threshold number (e.g., 10 times). The threshold number, as well as the percentage of locations to exclude, can be configurable to fine tune a balance between certainty (e.g., a larger area in a LAC location can result in more confidence that a mobile device in the LAC is actually located in the location area represented by the LAC) and precision (e.g., a area in a LAC location can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the LAC location is sufficiently small. In LACs where mobile devices are highly concentrated, a LAC location can be sufficiently small that further passes will not necessarily increase the precision. The repetition of stages 324, 326, and 328 can terminate when the radius of the circle reaches below a threshold radius. The threshold radius can differ from location area to location area, based on the distribution pattern of the locations in the set received (e.g., number of location data points received, density of the location data points, and concentration areas in the cells).

The system can designate (332) the geographic area as a circle having the average geographic location as a center and a radius based on at least one calculated distance. The geographic area can be associated with a LAC. The center can be represented in latitudes and longitudes. In some implementations where distances are calculated in three-dimensional spaces, the center can further be represented in an altitude.

Figure 3C:
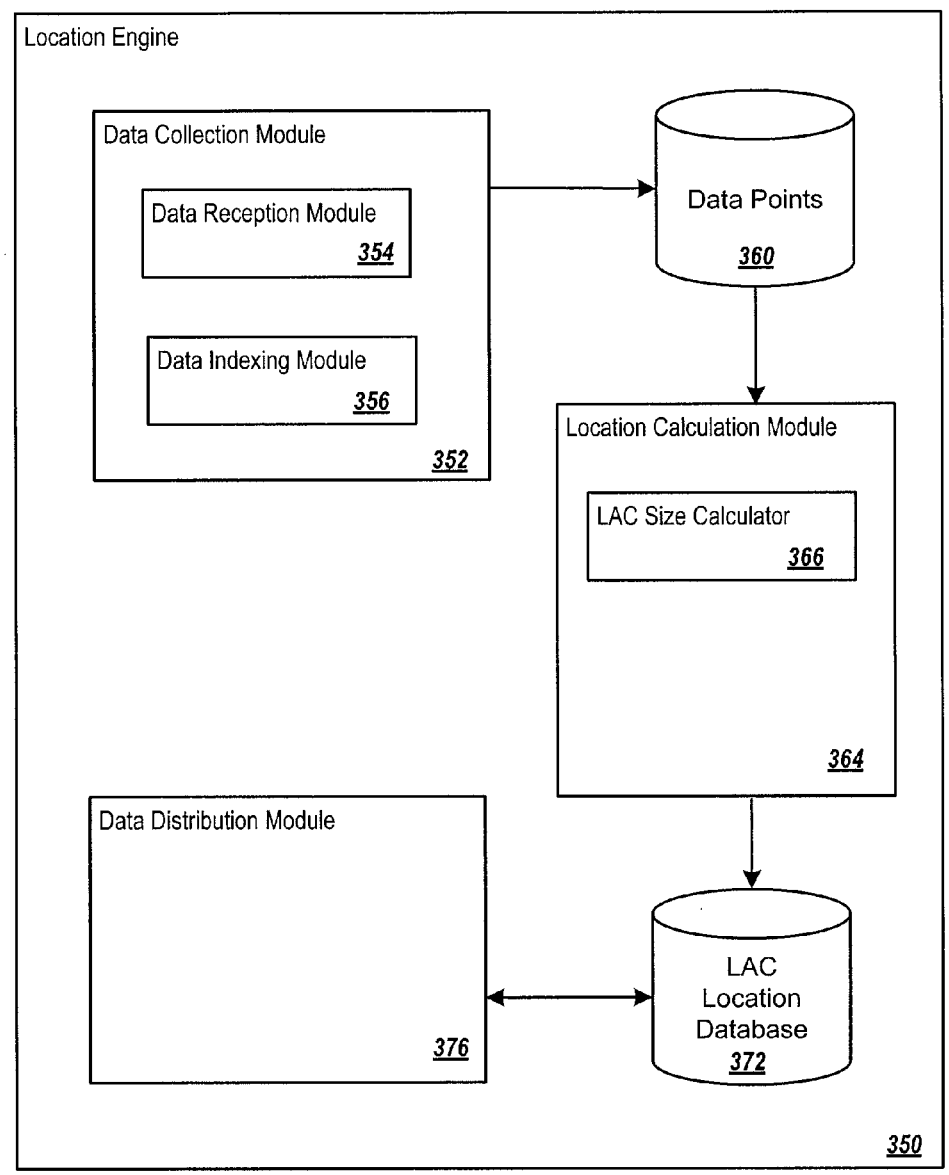
FIG. 3C is a block diagram illustrating an exemplary system implementing techniques of location determination using cached location area codes.

FIG. 3C is a block diagram illustrating an exemplary system implementing techniques of location determination using cached location area codes. The system can include one or more processors, one or more memory devices storing instructions, and other hardware or software components. The system can include location engine 350 that can be used to determine a LAC location to be associated with a LAC.

Location engine 350 can include data collection module 352 that can receive data from various mobile devices through various access points (e.g., access points 114) or cell towers (e.g., cell towers 122, 124, and 126). The data can include multiple data points that can indicate locations of one or more location-aware mobile devices (e.g., mobile devices 208) as well as current LACs and current cell IDs of the mobile devices. In some implementations, the data points can also include information on which time zone mobile devices 208 are located. Data collection module 352 can include data reception module 354, which can receive data transmitted from mobile devices 208, and data indexing module 356. Data indexing module 356 can perform various processing on the received data points. For example, data indexing module 356 can sort latitudes, longitudes, and altitudes based on cell IDs. Data indexing module 356 can also group data into sets based on time periods. For example, a new set of received locations can be created for a configurable period of time (e.g., six hours).

Sets of received locations of mobile devices 208, as well as associating LACs and cell IDs, can be stored in data point database 360. Data point database 360 can store current and historical locations of various mobile devices 208. Data point database 360 can include an ad hoc database, relational database, object-oriented database. Data point database 360 can be hosted locally or remotely in relation to location engine 350.

Location calculation module 364 can be utilized to calculate an average geographic location in sets of data points in data points database, calculate distances between the average geographic location and locations of various data points, and exclude locations from the sets for further computation. Location calculation module 364 can perform the calculations for a particular set (e.g., a set of data points associated with a cell ID) until an exit condition is reached for the particular set. Location calculation module 364 can determine LAC locations for each LAC.

In some implementations, location calculation module 464 can calculate the sizes of location areas represented by the LACs using LAC size calculator 366. LAC size calculator 366 can count the number of distinct cell IDs associated with each LAC and determine how many cells are included in each of the location areas. LAC size calculator 366 can exclude those LACs whose sizes are below a threshold (e.g., those LACs having fewer than 30 cells).

A LAC location can be defined by a center having the average latitude, longitude, and altitude coordinates of the set of locations. The LAC location can be further defined by a radius determined based on distances from locations in the set of locations to the center. The latitude, longitude, and altitude coordinates of centers for the LAC locations and the radii of the LAC locations can be stored in LAC location database 372. LAC location database 372 can be updated periodically by location calculation module 364.

The data of LAC location database 372 can be distributed to mobile devices using data distribution module 376. Data distribution module 376 can send information of LAC locations (e.g., center coordinates and radii) that are associated with LACs to mobile devices (e.g., non-GPS-enabled mobile device 210) upon request, through broadcasting, or using various push technology without receiving requests from the mobile devices.

Figure 4A:
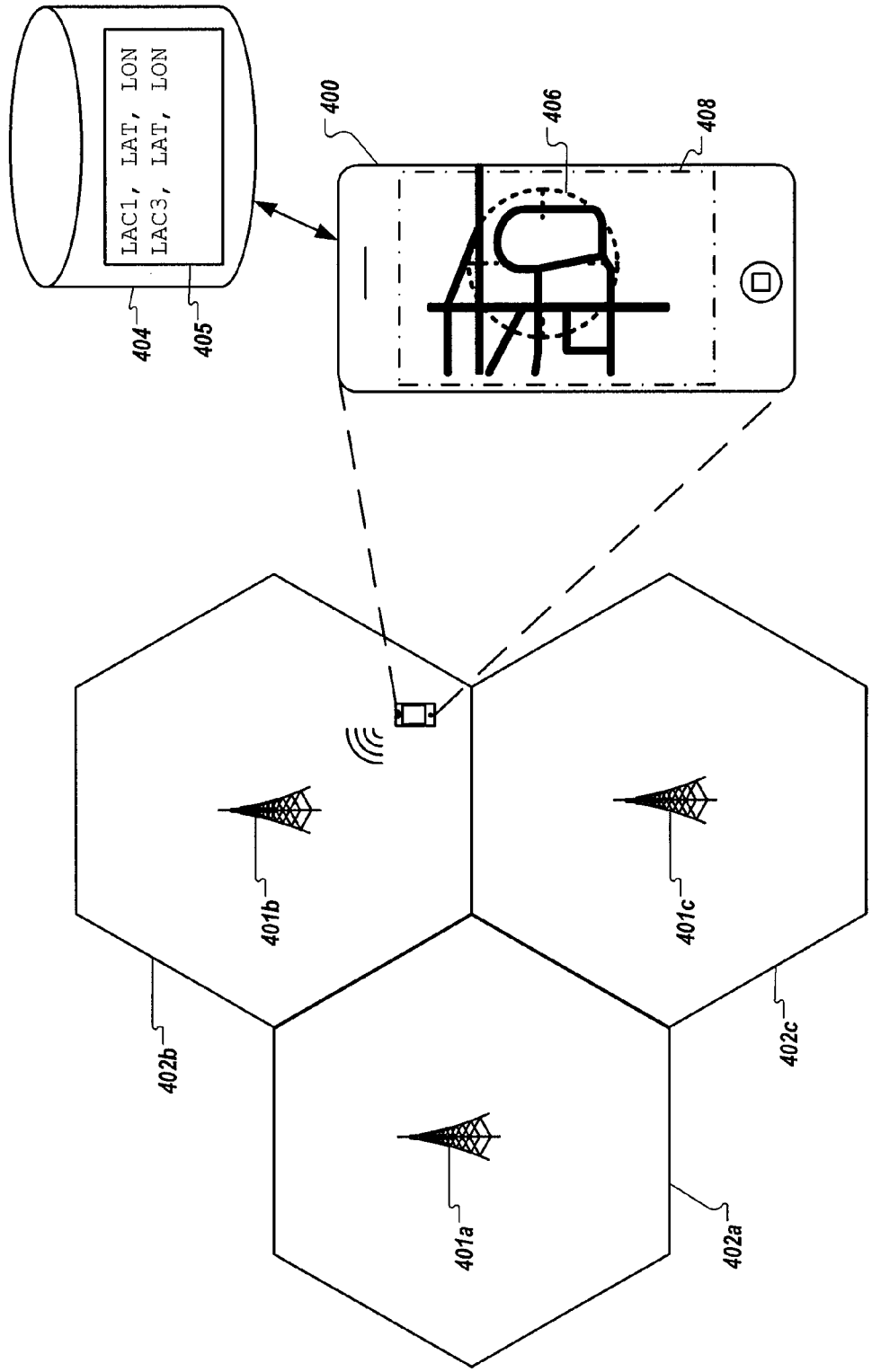
FIG. 4A is an overview of techniques of location determination using cached location area codes implemented on mobile devices.

Exemplary Process for Determining Locations of Mobile Devices Using Locations of Wireless Access Points FIG. 4A is an overview of techniques of location determination using cached location area codes performed on mobile devices. Mobile device 400 can be a mobile device that can connect to a cellular communications network through cell towers 401. Mobile device 400 can receive a current LAC from cell towers 401. Based on the current LAC, mobile device 400 can determine a current location by performing a lookup of the current LAC in cached LAC location database 404. The current location can be a coarse location, whose accuracy can be further improved by adaptive location calculations.

Mobile device 400 can store, or otherwise be connected to, LAC location database 404. LAC location database 404 can include a set 405 of location area codes (LACs) of one or more cellular communications networks. Each LAC (e.g., "LAC1") can be associated with at least a predetermined number of cells of the cellular communications network. The LAC can be associated with a geographic area, the geographic area including a first circle centered at a location and having a first radius representing an uncertainty of the location. The predetermined number of cells can represent a minimum number of cells (e.g., 30) that are required of a LAC to be included in LAC location database 404. For example, if a location area identified by the LAC "LAC1" includes at least two cells, "LAC1" and "LAC3" can be included in LAC location database 404 in association with the geographic area. The strings "LAC1," "LAC2," or "LAC3" are used in this specification for illustrative purposes. An actual LAC can be a hexadecimal value.

The geographic area stored in association with a LAC in LAC location database 404 can be an estimate of the location area represented by the LAC. However, the geographic area stored in association with a LAC need not map exactly to the shape, size, or center of the location area represented by the LAC. For example, "LAC1" in LAC location database 404 can represent a location area that includes cells 402a-c, served by cell towers 401a-c. The geographic area stored in association with "LAC1" can be a circle, whose center can be inside or outside the polygon formed by cells 402a-c.

Mobile device 400, when located in a cell (e.g., cell 402b) that is included in the location area designated by a LAC (e.g., "LAC1"), can receive the LAC. The LAC representing a location area in which mobile device 400 is located will be referred to as a "current LAC" of mobile device 400. Mobile 400 can acquire the current LAC according to various protocols of the cellular communication network to which mobile device 400 is connected. For example, the current LAC can be sent from a cell tower (e.g., cell tower 401b) to which mobile device 400 is connected.

Mobile device 400 can perform a lookup in LAC location database 404 using the LAC received from cell tower 401b. For example, if the current LAC of mobile device 400 is "LAC1," mobile device 400 can identify the geographic area (e.g., a circle) that is associated with "LAC1" from LAC location database 404.

Upon identifying the geographic area associated with the current LAC, mobile device 400 can display the geographic area on display device 408. Display device 408 can include a map display, which can display a stored digital map or a digital map received wirelessly. The geographic area can be displayed as circle 406 overlaying on the map on display device 408. The center of circle 406 can correspond to the longitude and latitude of the geographic area stored in association with the current LAC. The radius of circle 405 can correspond to a radius of the geographic area, scaled to a display size of the map.

Figure 4B:
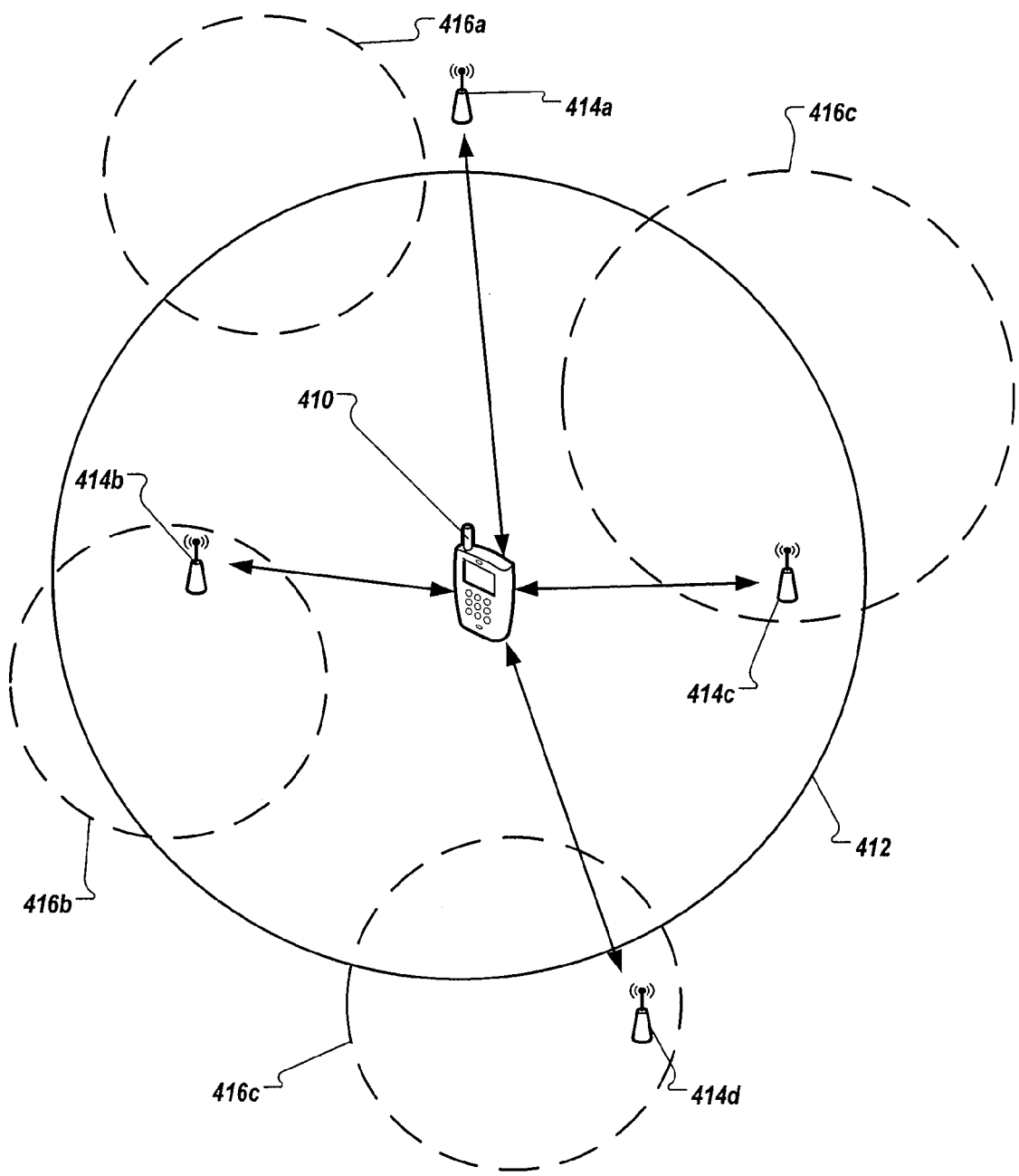
FIG. 4B illustrates techniques of improving accuracy of a location associated with a LAC using locations of wireless access points.

FIG. 4B illustrates techniques of improving accuracy of a location associated with a LAC using locations of wireless access points. Mobile device 410 can be an exemplary mobile device that can use locations of wireless access points to determine its location. An exemplary section of a communication network that includes access points 410 is illustrated. Mobile device 410 can be associated with a current LAC, and can identify a coarse current location based on the current LAC.

Mobile device 410 can be wirelessly connected to access point 414a. Access point 414a can be an access point of a WLAN (e.g., a WiFi network). From access point 414a, mobile device 410 can receive data that include locations of neighboring access points. Mobile device 410 can store the received data on a storage device. The stored data can be updated periodically.

In the example shown, mobile device 410 is connected to access point 410a. In addition, mobile device 410 is within communication ranges to access points 414b, 414c, and 414d. Mobile devices 410 can identify access points 414a, 414b, 414c, and 414d under wireless communication protocols used in the WLAN (e.g., IEEE 802.11a). Access points 414a,

414*b*, 414*c*, and 414*d* can be identified by MAC addresses of the access points or other identifiers (e.g., Bluetooth™ identifiers).

Mobile device 410 can identify presence areas 416*a*, 416*b*, 416*c*, and 416*d* that are associated with access points 414*a-d*, respectively. A "presence area" (e.g., presence area 416*a*) can be an estimated area that is associated with an access point (e.g., access point 414*a*) in which mobile devices connected to access point 414*a* is likely to be located. Identifying presence areas 416*a-d* can include retrieving information on the presence areas 416*a-d* from a memory device coupled to mobile device 410. In some implementations, mobile device 410 can request from a server the presence areas 416*a-d* by sending to the server identifiers (e.g., media access control (MAC) addresses) of access points 414*a-d*.

Based on presence areas 416*a-d*, mobile device 410 can execute an iterative process (e.g., a multi-pass analysis) on the presence areas 416*a-d*. The iterative process can produce geographic area 412, which can be an estimate of the current geographic location of mobile device 410. Geographic area 412 can be a geographic space when three-dimensional location information is utilized. Mobile device 410 can display the estimated current location on a display device (e.g., on a map display). The estimated current location can be a location that can improve upon the coarse location determined by using LAC alone.

Figure 4C:
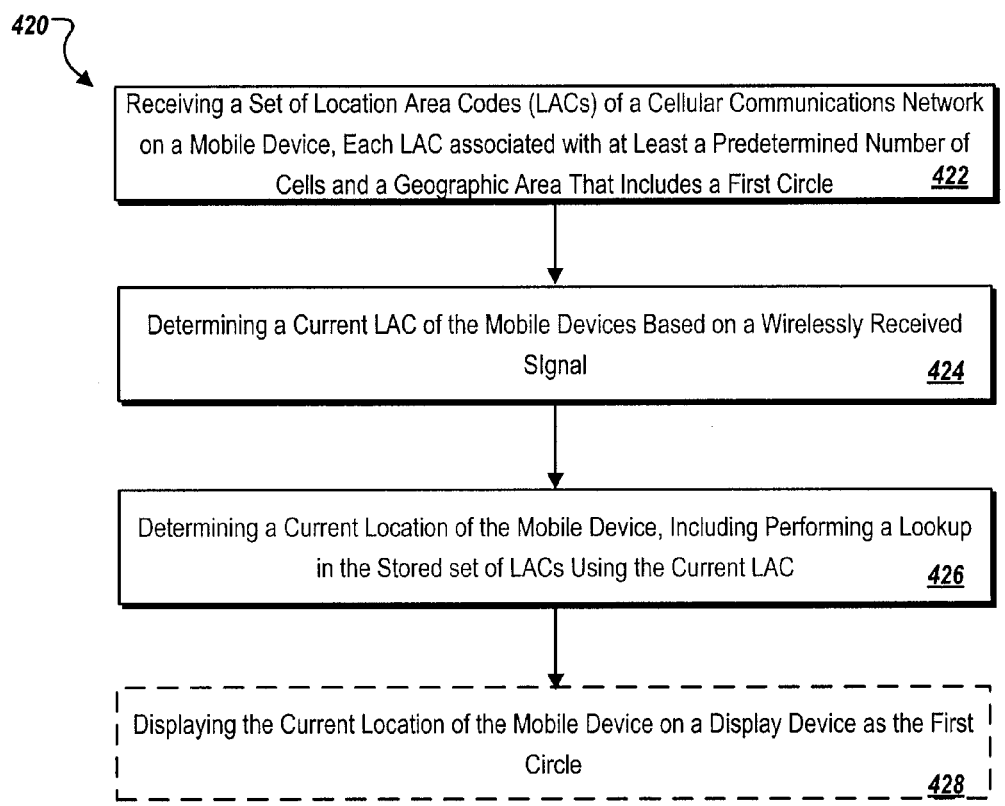
FIG. 4C is a flowchart illustrating an exemplary process of determining an estimated location using cached location area codes, executed on a mobile device.

FIG. 4C is a flowchart illustrating exemplary process 420 of determining an estimated location using cached location area codes, executed on a mobile device. For convenience, process 420 will be described in referenced to mobile device 400 that implements process 420.

Mobile device 400 can receive (422) a set of location area codes (LACs) of a cellular communications network. Each LAC in the set can be associated with at least a predetermined number of cells of the cellular communications network. The LAC can further be associated with a geographic area (e.g., a LAC location). The geographic area can be defined as a circle, centered at a particular location and having a radius representing an uncertainty of the location.

Receiving (422) the set of LACs can include storing the set of LACs in a read-only memory (ROM) component of mobile device 400. The ROM component can be installed by a manufacturer. Receiving (422) the set of LACs can also include downloading the set of LACs from a server computer (e.g., by downloading to mobile device 400 an application program from the server computer upon a request from mobile device 400). Receiving (422) the set of LACs can also include automatically and wirelessly receiving the set of LACs being pushed by the server computer, through a wireless access point or a cell tower.

The set of LACs received in stage 422 can be selected based on various criteria. In some implementations, location area size can be a selection criterion. Location area size can correspond to a predetermined number of cells encompassed in the location area. For example, a LAC that corresponds to a location area that encompasses a certain number of cells (e.g., 30 cells) can be included. LACs not satisfying the criterion (e.g., having fewer than a predetermined number of cells) can be excluded. Another selection criterion can be a number of data points received from the LAC. A data point can correspond to a transmission of a location from a location-aware mobile device to the server computer, the location being associated with a LAC. The LAC can be included if the server computer has received a sufficient number of data points (e.g., a statistically significant number such that a LAC location can be calculated).

Mobile device 400 can determine (424) a current LAC of mobile device 400 based on a wirelessly received signal. Determining a current LAC can include querying a processor in mobile device 400 that is dedicated to processing communication functions (e.g., a baseband processor).

Mobile device 400 can determine (426) a current location of mobile device 400. Determining the current location can include performing a query into LAC location database 404 using the current LAC. The query can retrieve a LAC location, which can be used as a coarse estimate of the current location. The current location can include a circle, for example, that encompasses a city. Performing the coarse estimate can have the advantage of minimizing consumption of resources (e.g., CPU cycles, communication bandwidths, and battery power of mobile device 400) in determining a current location. Accuracy of the coarse estimate of the current location can optionally be improved by further calculations.

Mobile device can optionally display (428) the current location of mobile device 400 on a display device. The current location can be displayed as a first circle (e.g., the circle of the LAC location), which can be centered at a location point defined by a latitude and a longitude, and having a radius that can represent an uncertainty of the location point.

Displaying (428) the current location can optionally further include displaying a second circle replacing the first circle. The second circle can correspond to an improved estimate of the current location of mobile device 400, which can be an improvement upon the coarse estimate based on current LAC. The second circle can have a radius that is less that the radius of the first circle, reflecting the improved accuracy. The second circle can be determined by an adaptive location determination process, which will be described in further detail below with respect to FIG. 4D.

Figure 4D:
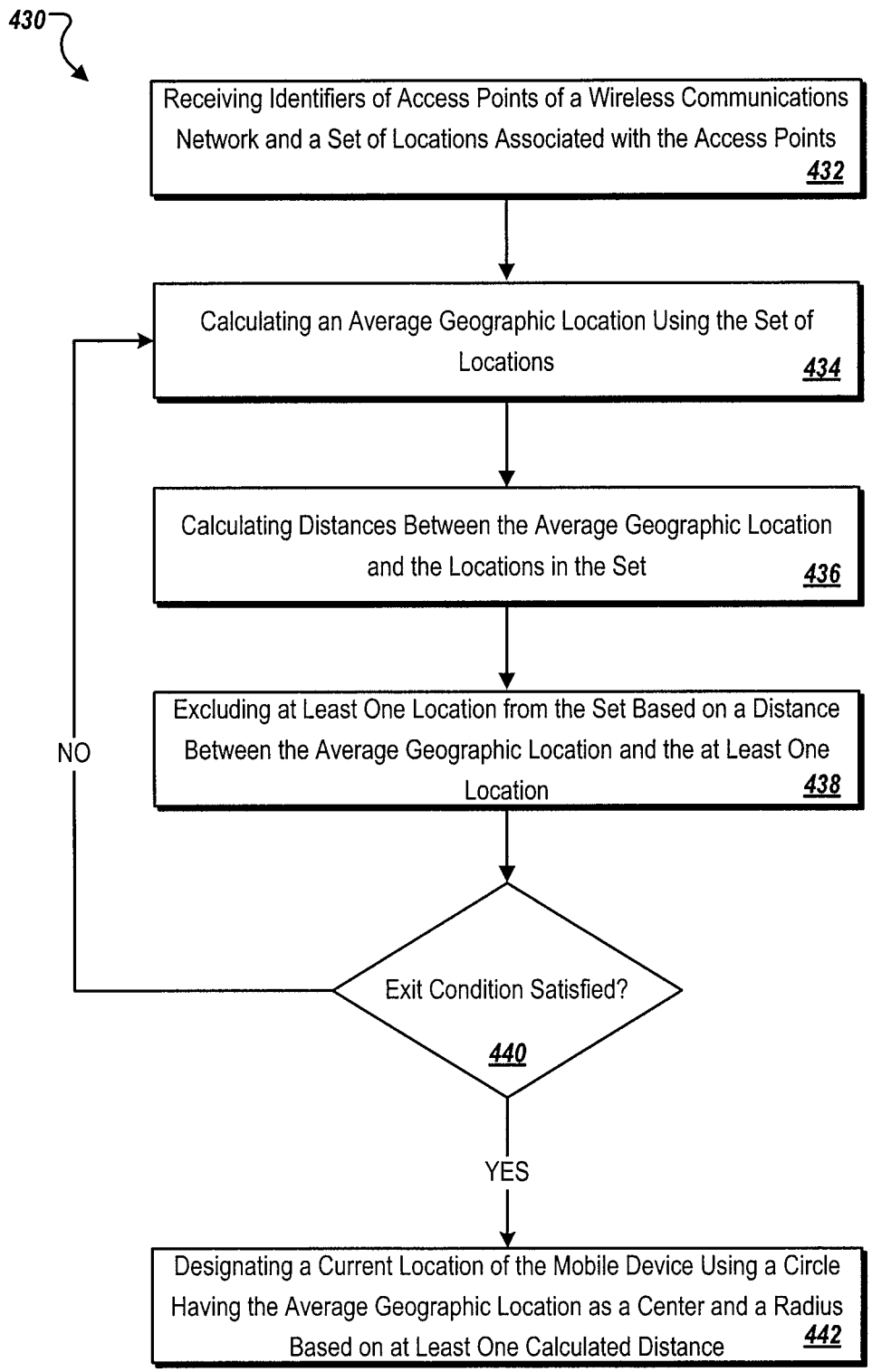
FIG. 4D is a flow chart illustrating an exemplary process of improving accuracy of a location associated with a LAC using locations of wireless access points.

FIG. 4D is a flowchart illustrating exemplary process 430 of determining a location of a mobile device using locations of wireless access points. For convenience, process 430 will be described in reference to mobile device 410 that implements process 430.

Mobile device 410 can receive (432) identifiers of access points (e.g., access points 414) of a wireless communication network (e.g., a WLAN) and a set of locations associated with the access points. The set of locations can correspond to presence areas 416 or presence spaces associated with the access point. Each location can be represented by geographic coordinates (e.g., latitude, longitude, and altitude). Each location can be associated with an identifier (e.g., a MAC address) of an access point 414. In various implementations, the set of locations can be received from a server periodically or upon request.

Mobile device 410 can calculate (434) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a location at a median latitude, median longitude, and median altitude of the positions in the set as the average geographic location.

Mobile device 410 can calculate (436) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the earth into consideration.

The distances calculated in stage 436 can be designated as a radius associated with a center. The center can be the average geographic location calculated in stage 434, which can be a center of a circle (e.g., circle surrounding geographic area 412). The radius of the circle can be determined based on at least one distance between a location in the set of locations and the average geographic location. In some implementations, the radius can equal to the longest distance between the average geographic location and a location remaining in the set. In some implementations, the radius can be a distance that, when a circle is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

Mobile device 410 can exclude (438) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating a current location of mobile device 410, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 50 meters for the first pass, 30 meters for the second pass, etc.). The system can exclude at least one location from the set when the distance between the average geographic location and the location exceeds the threshold distance.

Mobile device 410 can repeat stages 434, 436, and 438 of process 430 until an exit condition is satisfied. The system can determine (440) whether an exit condition is satisfied for terminating the repetition. In some implementations, the exit condition can be satisfied when a number of repetitions reach a threshold number (e.g., five times). The threshold number can relate to a number of locations in the originally received set. The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 440 can be satisfied when the presence area or presence space is sufficiently small. In areas where access points 414 are highly concentrated, an estimated current location can include an area sufficiently small that further passes will not necessarily increase the precision. The repetition of stages 434, 436, and 438 can terminate when the radius of the circle reaches below a threshold radius. For example, the threshold radius can be 8-10 meters. The threshold radius can be based on radii of presence areas 416. In some implementations, if some radii of presence areas 416 are sufficiently small, the threshold radius can be small, to reflect a confidence on the estimate.

Mobile device 410 can designate (442) the current location of mobile device 410 using a circle having the average geographic location as a center and a radius based on at least one calculated distance. The center can be represented in latitudes and longitudes. In some implementations, where distances are calculated in three-dimensional spaces, the center can further be represented in an altitude. In some implementations, mobile device 410 can further display the current location on a display device on a map user interface. Exemplary map user interfaces will be described below in reference to FIG. 5.

Figure 4E:
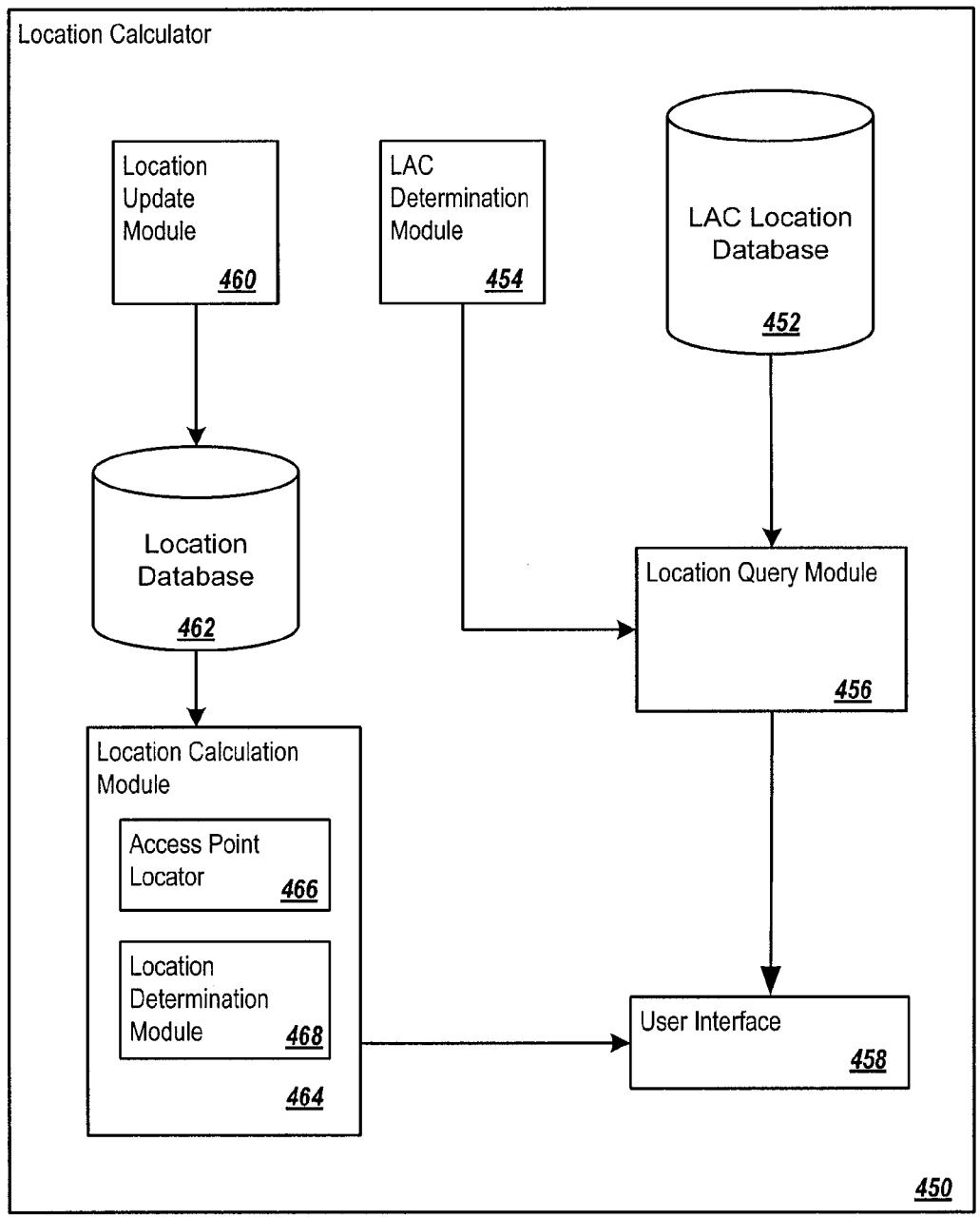
FIG. 4E is a block diagram illustrating an exemplary system implementing techniques of improving accuracy of a location associated with a LAC using locations of wireless access points

FIG. 4E is a block diagram illustrating an exemplary system implementing techniques of location determination using cached location area code using mobile devices. The system can include one or more processors (e.g., an application processor and a baseband processor), one or more memory devices storing instructions, and other hardware or software components. The system can include location calculator 450 that can be used to determine an improved location estimate for a mobile device (e.g., mobile device 410).

Location calculator 450 can include LAC location database 452 that can store a set of LACs and corresponding LAC locations. In some implementations, the LACs and corresponding LAC locations stored in LAC location database 452 can be updated periodically or upon request. LAC determination module 454 can determine a current LAC of mobile device 410. In some implementations, to determine the current LAC of mobile device 410, LAC determination module 454 can query a baseband processor of mobile device 410 by calling an application programming interface (API) of the baseband processor. In some implementations, LAC determination module 454 can determine a current cell ID in addition to the current LAC.

Location query module 456 can perform a query into LAC location database 452 using the current LAC retrieved by LAC determination module 454. The query can map the current LAC into a LAC location, in accordance to records in LAC location database 452. The LAC location can be presented to user interface 458 for display. User interface 458 can include a map display, which can display a digital map and overlay the LAC location that has been mapped to the current LAC by location query module 456. Overlaying the LAC location on the map can include displaying the LAC location as a circle on the map.

Location update module 460 can receive from one or more server computers location data on one or more access points of a wireless network. The data can include multiple identifiers of one or more access points (e.g., access points 414) as well as locations associated with the access points. In some implementations, the identifiers of the access points can correspond to access points that are located within the LAC location that corresponds to the current LAC of mobile device 410. Location update module 460 can receive the location data when a user of mobile device 410 requests the data (e.g., when a user requests an improvement of the coarse location estimate based on the LAC). Location update module 460 can also receive the location data automatically. For example, location update module 460 can also receive the location data through an update when mobile device 410 has identified a new current LAC (e.g., by moving from one location area to another location area). In some implementations, the data points received by location update module 460 can include access points that are located within a current cell of mobile device 410.

Location database 462 can store the location data of the access points within the current location area or the current cell. Location database 462 can be updated by location update module 460, and can be queried by location calculation module 364.

Location calculation module 364 can include access point locator 366. Access point locator 466 can include devices and software for determining available access points. Available access points can include access points with which mobile device 410 can communicate. Depending on the geographic location of mobile device 410 and the access points, mobile device 410 can be within communication range of multiple access points, even though mobile device 410 may be connected with only one particular access point. Mobile device 410 can use the access points within communication range to perform location calculations to improve upon the coarse location determined based on the current LAC.

Location lookup module 468 can query location database 462 and identify a set of locations corresponding to the access points that are within communication range. Location calculation module 464 can calculate an average geographic location in sets of locations identified from location database 462, calculate distances between the average geographic location and locations of various locations, and exclude locations from the sets for further computation. Location calculation module 464 can perform the calculations for a particular set (e.g., a set of locations identified by location lookup module 468) until an exit condition is reached for the particular set. Location calculation module 464 can determine a current location of mobile device 410.

The current location of mobile device 410, as determined by location calculation module 464, can be displayed on user interface 458. The current location can be an improvement of the coarse location determined by location query module 456. Improving the coarse location can be performed on an as-needed basis. For example, the operations performed by modules 460, 462, 464, 466, and 468 can occur upon a user request, or when the coarse location is displayed on user interface 458 for a certain amount of time (e.g., 10 seconds), which can indicate that the user may have an interest in acquiring an improved current location.

Exemplary User Interfaces of Location Determination Using Cached LAC

Figure 5:
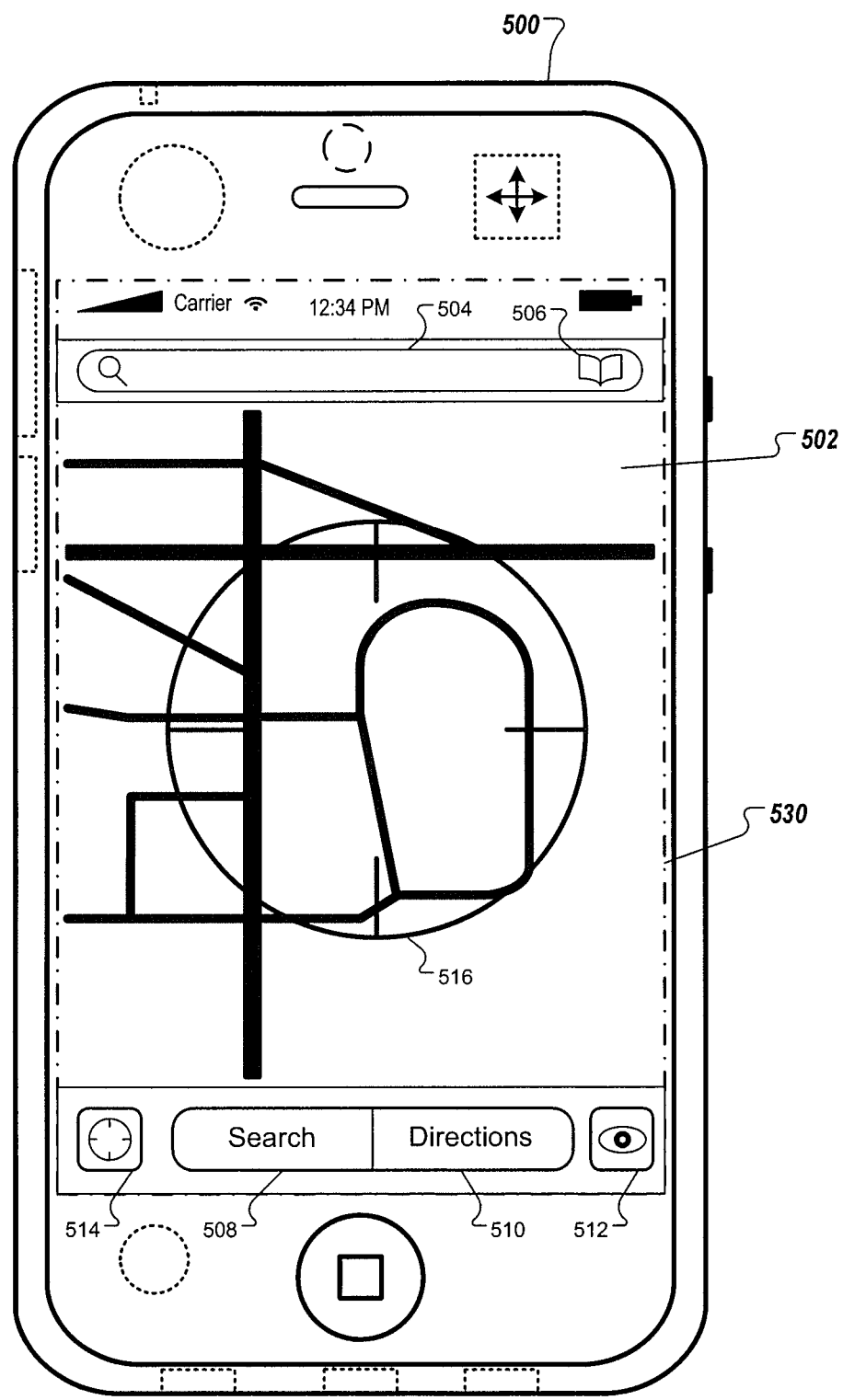
FIG. 5 illustrates an exemplary user interface for location determination using cached location area codes.

FIG. 5 illustrates an exemplary user interface for location determination using cached location area code using mobile devices. In FIG. 5, example map 502 of a geographic area is displayed on mobile device 500. Mobile device 500 can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Exemplary map 502 with a geographic area can be displayed on mobile device 500. Mobile device 500, when in a location area, can acquire a current LAC. Mobile device 500 can retrieve a LAC location corresponding to the current LAC by requesting from a server LAC location, or query a LAC location database (e.g., LAC location database 452) stored on a storage device on mobile device 500. In some implementations, mobile device 500 can display the map 502 on the touch sensitive display 530 of mobile device 500. The map 502 can be displayed when a user selects a maps object to view mapping and location based services. In some implementations, objects, such as the maps object, can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list that contains addresses that are frequently visited, such as a user's home address. The Bookmarks list can also, for example, contain special bookmarks such as the current location (e.g. the current location of mobile device 500).

Search object 508 can be used to display search bar 504 and other map related search menus. The directions object 510 can, for example, bring up a menu interface that allows the user to enter a start and end location. The interface can then display information (e.g., directions and travel time for a route from the start location to the end location). Map view object 512 can bring up a menu that can allow the user to select display options for map 502. For example, map 502 can be changed from black and white to color, the background of the map can be changed, or the user can change the brightness of the map.

Current location object 514 can allow the user to see geographic area 516 on map 502 indicating where device 500 is currently located. Geographic area 516 can correspond to a LAC location (e.g., circle 206*d*) that can be used as a coarse estimate of the current location of mobile device 500. The LAC location can have a center that is an average geographic location of data points associated with a location area where mobile device 500 is located. The LAC location can have a radius that can be determined based on a distance between the average geographic location and one or more locations associated with a current location area. The circle surrounding geographic area 516 can be replaced by another circle with smaller radius, when mobile device 500 can improve the accuracy of a current location estimate. A special current location bookmark can be placed in the Bookmarks list when current location object 514 is selected. If the special current location bookmark was previously set in the Bookmarks list, the old bookmark information can, for example, be replaced with the new current location information. In some implementations, the special current location bookmark is tied to the centroid of geographic area 516. That is, the special current location bookmark can include the coordinates for the centroid of geographic area 516. Geographic area 516 can be based on location data determined or estimated using location calculator 450 as previously described in reference to FIG. 4E. Geographic area 516 can, for example, be depicted by a circle, rectangle, square, hexagon, or other enclosed region with crosshairs, or some other distinctive element to differentiate geographic area 516 from map 502.

In some implementations, geographic area 516 can indicate a region in which mobile device 500 is determined or estimated to be located, and the geographic area may not necessarily be centered on the actual current position of mobile device 500. In this example, mobile device 500 may be located off-center within the geographic area. In another example, geographic area 516 can be centered on an estimated current position of mobile device 500 (e.g., the center of the LAC location).

Mobile device 500 can, for example, center the map view on geographic area 516 when the current location object 514 is tapped or otherwise selected. In some implementations, the zoom level of the map can be adjusted based on the accuracy or precision of the location data or the technology, system, or service that provided the location data. For example, the map can be zoomed out when mobile device 500 cannot receive GPS signals for lower accuracy and uses cell tower data to determine its location. The map can be zoomed in for higher accuracy if mobile device 500 is capable of using GPS location data to determine its current location. In some implementations, the zoom level can be based on the velocity of mobile device 500 (e.g., the map can be zoomed out at higher velocities and zoomed in when mobile device 500 is not moving). A combination of accuracy or precision and velocity can also be used.

If all methods for retrieving location-based data fail (e.g., when mobile device 500 is not within communication range of any cell tower or wireless access points), and there are no other systems or services available for determining or estimating the current position of mobile device 500, an error can be displayed to the user and no geographic area is displayed on map 502. The error can, for example, contain a message to the user informing them of the failure and the possible reason or reasons for the failure.

Current location object 514 can be selected, for example, to activate the estimating and displaying of geographic area 516 on map 502, to get directions to or from the estimated current location (i.e., the centroid of geographic area 516), to send the estimated current location of mobile device 500 to a friend (e.g., such that the friend can go to the same location), or to create a bookmark for the estimated current location.

Exemplary System Architecture

Figure 6:
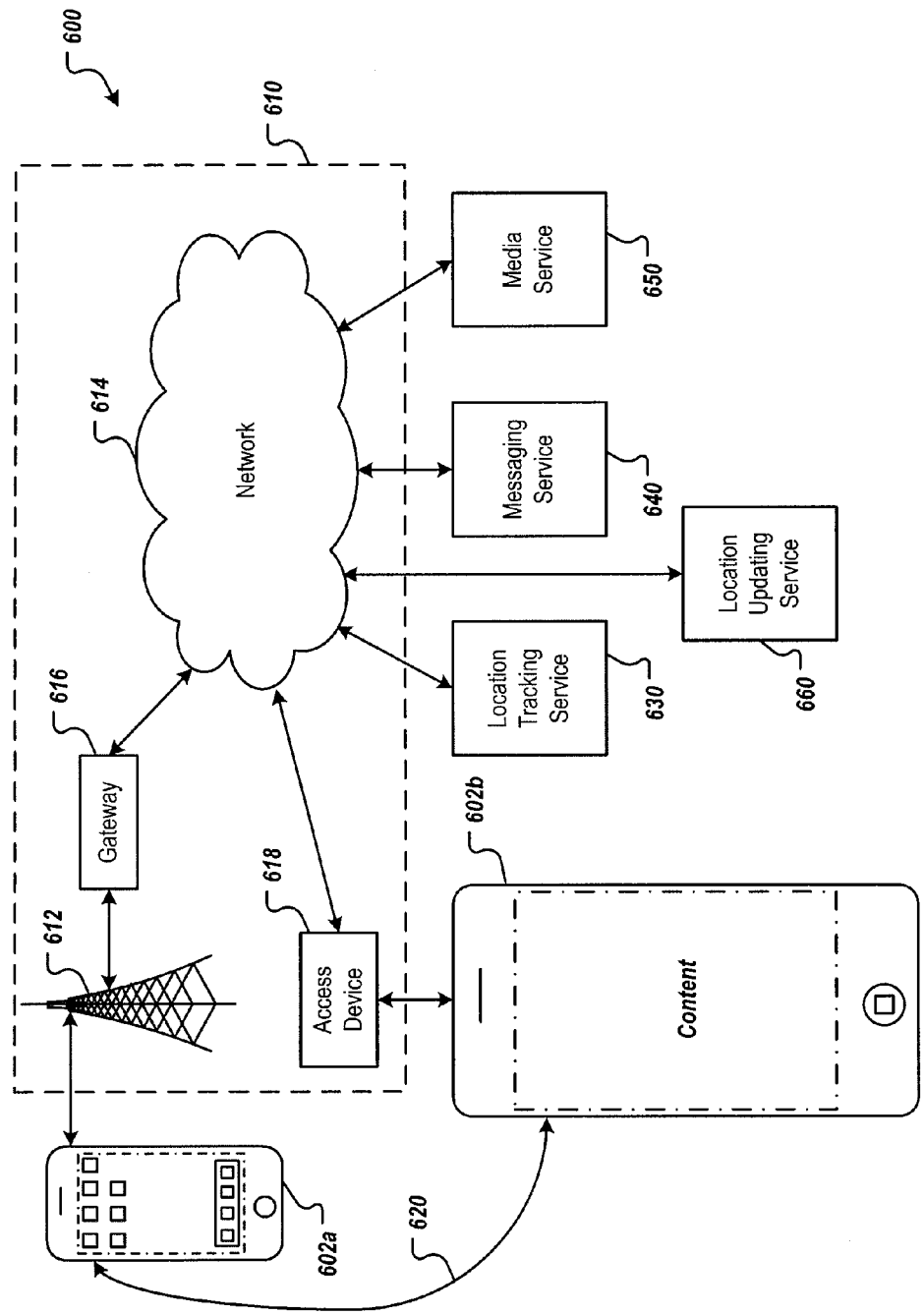
FIG. 6 is a block diagram illustrating an exemplary network architecture for implementing the features and operations described in reference to FIGS. 1-5.

FIG. 6 is a block diagram of an exemplary network operating environment for the mobile devices of 1-5. Mobile devices 602a and 602b can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over wireless network 612 and the access device 618. For example, mobile device 602a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 612, gateway 616, and wide area network 614 (e.g., using Transmission Control Protocol/Internet Protocol (TCP/IP) or User Datagram Protocol (UDP)). Likewise, in some implementations, the mobile device 602b can place and receive phone calls, send and receive e-mail messages, and retrieve electronic documents over the access device 618 and the wide area network 614. In some implementations, mobile device 602a or 602b can be physically connected to the access device 618 using one or more cables and the access device 618 can be a personal computer. In this configuration, mobile device 602a or 602b can be referred to as a "tethered" device.

Mobile devices 602a and 602b can also establish communications by other means. For example, wireless device 602a can communicate with other wireless devices, e.g., other mobile devices 602a or 602b, cell phones, etc., over the wireless network 612. Likewise, mobile devices 602a and 602b can establish peer-to-peer communications 620, e.g., a personal area network, by use of one or more communication subsystems, such as the Bluetooth™ communication devices. Other communication protocols and topologies can also be implemented.

The mobile device 602a or 602b can, for example, communicate with one or more services 630, 640, 650, 660, and 670 over the one or more wired and/or wireless networks. For example, one or more location tracking services 630 can calculate LAC locations to be associated with each LAC, determine how many cells are to be associated with each LAC, and create a LAC location database. The LAC location database can be sent to mobile devices 602a and 602b. In some implementations, location tracking services 630 can also calculate locations to be associated with access points.

Messaging service 640 can, for example, provide e-mail and/or other messaging services (e.g., Short Message Service (SMS)). Messaging service 640 can allow a current user of a mobile device (e.g., device 602a) to communicate with a requester who requests location information of device 602a. Device security service 650 can, for example, provide functions for analyzing security events to determine security risk factor, sending security commands to mobile devices 602a and 602b, and processing security status information sent from mobile devices 602a and 602b.

Location updating service 660 can determine whether to send location information, including LAC location database and locations of one or more access points, to mobile devices 602a and 602b. Upon determination that the information is to be sent (e.g., based on a request from mobile device 602a or 602b), Location updating service 660 can transmit the information to mobile devices 602a and 602b.

Mobile device 602a or 602b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 602a or 602b. Such access can be provided by invocation of a web browsing function or application (e.g., a browser) in response to a user touching, for example, a Web object.

Exemplary Mobile Device Architecture

Figure 7:
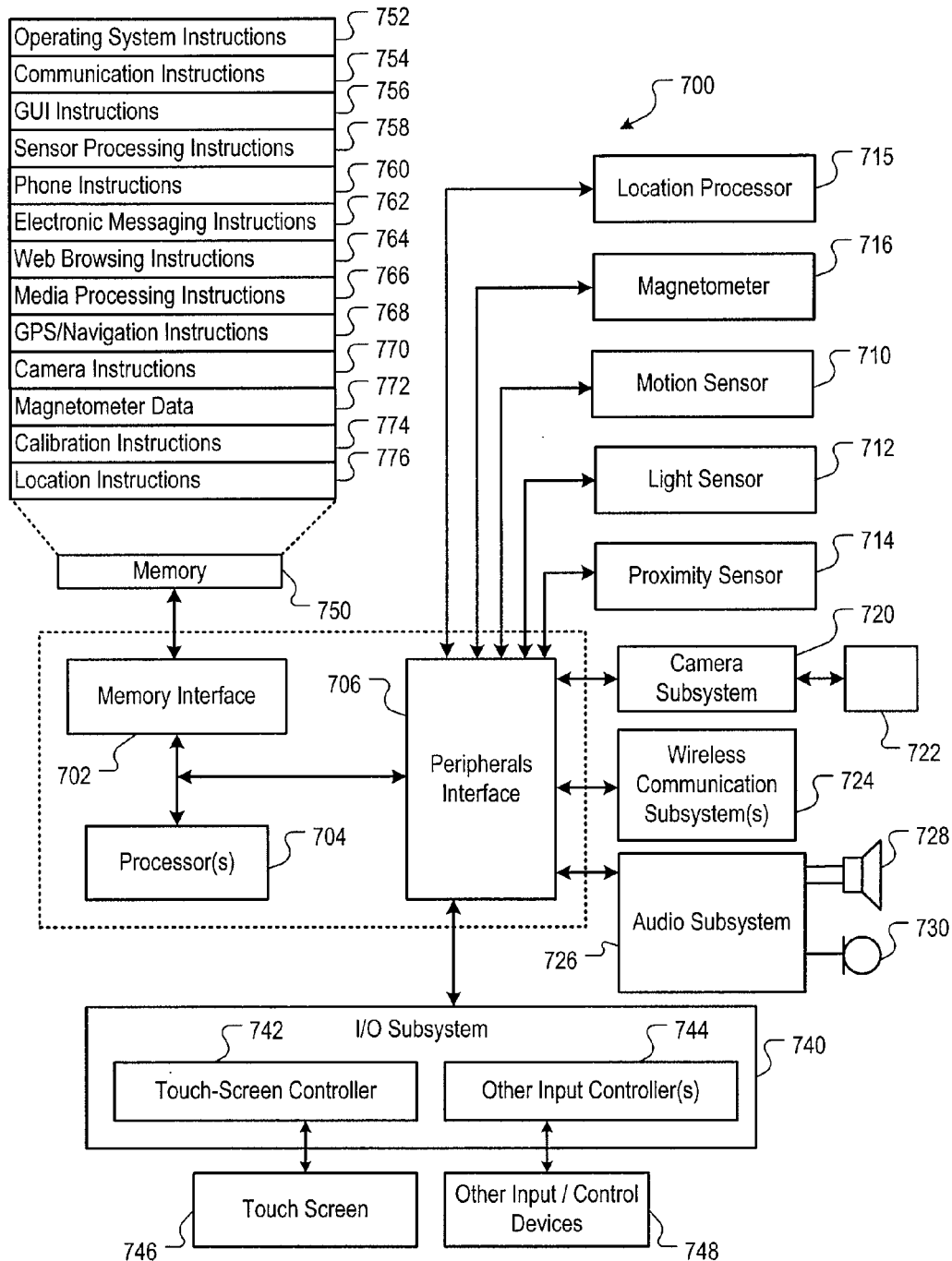
FIG. 7 is a block diagram illustrating an exemplary device architecture of a mobile device implementing the features and operations described in reference to FIGS. 1-5.

FIG. 7 is a block diagram of an exemplary architecture 700 for the mobile devices of FIGS. 1-6. A mobile device can include memory interface 702, one or more data processors, image processors and/or central processing units 704, and peripherals interface 706. Memory interface 702, one or more processors 704 and/or peripherals interface 706 can be separate components or can be integrated in one or more integrated circuits. The various components in mobile device 208, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metaloxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 410 on or off. The user may be able to customize a functionality of one or more of the buttons. The touch screen 746 can, for example, also be used to implement virtual or soft buttons and/or a keyboard.

In some implementations, mobile device 410 can present recorded audio and/or video files, such as MP3, AAC, and MPEG files. In some implementations, mobile device 410 can include the functionality of an MP3 player, such as an iPod™. Mobile device 410 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include location instructions 776 that can be used to transmit a current location to an access point, and to determine an estimated current location based on location data associated with access points to which the mobile device is within a communication range.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary System Architecture

Figure 8:
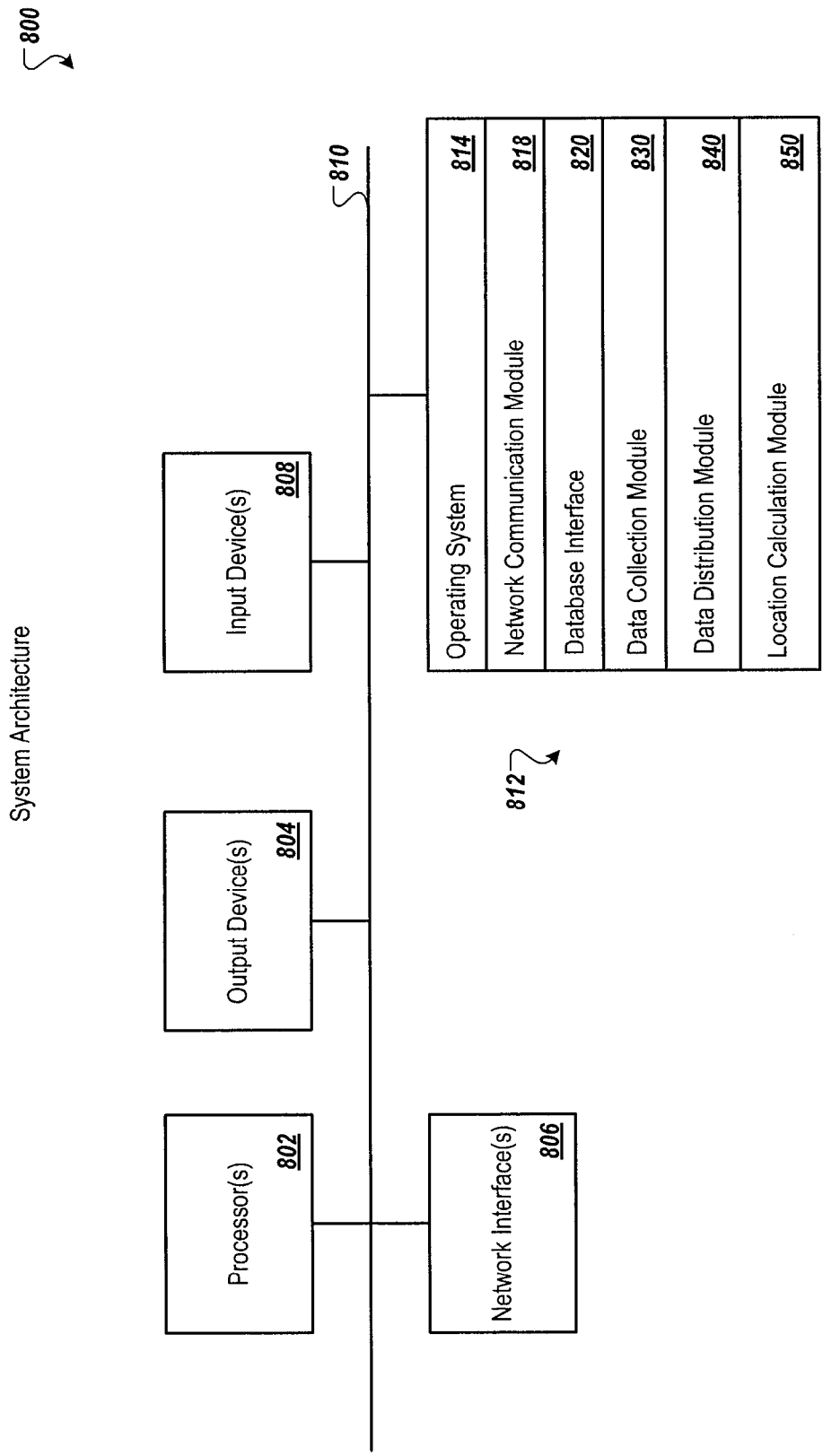
FIG. 8 is a block diagram of an exemplary system architecture for implementing the features and operations described in reference to FIGS. 1-5.

FIG. 8 is a block diagram of an exemplary system architecture 800 for implementing the features and operations described in reference to FIGS. 1-5. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., Mac OS® server, Windows® NT server), network communication module 816, database interface 820, data collection module 830, data distribution module 840, and location calculation module 850, as described in reference to FIGS. 1-5. Operating system 814 can be multi-user, multiprocessing, multitasking, multithreading, real time, etc. Operating system 814 performs basic tasks, including but not limited to: recognizing input from and providing output to devices 806, 808; keeping track and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.). Database interface 820 can include interfaces to one or more databases (e.g., LAC location database 116) on a file system. The databases can be organized under a hierarchical folder structure, the folders mapping to directories in the file system. Data collection module 830 can include components for collecting data from multiple mobile devices wirelessly connected to system 800. Data distribution module 840 can perform various functions for transmitting location data (e.g., location records 118) in association with LACs of a cellular communications network to various computing devices, including mobile devices. Location calculation module 850 can include one or more components (e.g., location engine 350) for performing calculations on locations received from mobile devices.

Architecture 800 can be included in any device capable of hosting a database application program. Architecture 800 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, the location-aware devices are referred to as GPS-enabled. Location-aware mobile devices are not necessarily based on GPS technology. For example, mobile devices that can determine a location using triangulation are location-aware mobile devices and can be used in determining a LAC location. Cells are represented as hexagons in the figures. The actual shape of a cell can vary. Locations are described as "circles." The term "circle" used in this specification can include any geometric shape (e.g., an ellipsis, a square, a convex or concave polygon, or a free-style shape) that is not perfectly circular but is closed or has an appearance of an enclosure. The radius of a geometric shape that is not perfectly circular can include an average distance between various points on the boundary of the geometric shape and a center of the geometric shape. Accordingly, other implementations are within the scope of the following claims.

What is claimed is:

1. A method executed by a computer, comprising:
  receiving, from a set of first mobile devices:
    at least one location area code (LAC) of a cellular communications network, wherein each LAC is associated with a unique location area;
    cell identifiers of the cellular communication network; and
    a set of geographic locations of the set of first mobile devices, each of the geographic locations corresponding to one of the first mobile devices;
  calculating an estimated size of the location area of each received LAC, the estimated size being represented as an estimated number of cells included in the location area, wherein the estimated number of cells is determined based on the cell identifiers received from the set of first mobile devices;
  selecting at least one LAC based on the estimated size of the location area of the LAC reaching or exceeding a specified threshold;

determining, for each selected LAC, an estimated LAC location of the selected LAC using the set of geographic locations;

associating each selected LAC with the estimated LAC location based on the determining; and providing at least one selected LAC and the estimated LAC location associated with the at least one selected LAC to a second mobile device for estimating a current location of the second mobile device.

2. The method of claim 1, where the geographic locations comprise an altitude coordinate.

3. The method of claim 1, where selecting the LAC comprises:

ranking the at least one LAC based on the estimated size of the LAC; and selecting LACs that are top-ranked.

4. The method of claim 1, where the geographic locations comprise latitude and longitude coordinates.

5. The method of claim 1, where determining the estimated LAC location comprises:

calculating an average geographic location using the set of locations;

calculating distances between the average geographic location and locations in the set;

excluding at least one geographic location from the set based on a distance between the average geographic location and the at least one location;

repeating the operations of calculating the average geographic location, calculating the distances, and excluding at least one geographic location until an exit condition is satisfied; and designating as the LAC location a circle having the average geographic location as a center and a radius based on at least one calculated distance.

6. The method of claim 5, where the exit condition is satisfied when a number of repetitions reach a threshold number.

7. The method of claim 5, where excluding the at least one location from the set includes:

determining a threshold distance to the average geographic location within which a percentage of the locations in the set are located; and excluding the at least one location from the set when the distance between the average geographic location and the at least one location exceeds the threshold distance.

8. A system, comprising:

one or more computers configured to perform operations comprising:

receiving, from a set of first mobile devices:

at least one location area code (LAC) of a cellular communications network, wherein each LAC is associated with a unique location area;

cell identifiers of the cellular communication network; and a set of geographic locations of the set of first mobile devices, each of the geographic locations corresponding to one of the first mobile devices;

calculating an estimated size location area of each received LAC, the estimated size being represented as a number of cells included in the location area, wherein the estimated number of cells is determined based on the cell identifiers received from the set of first mobile devices;

selecting at least one LAC based on the estimated size of the location area of the LAC reaching or exceeding a specified threshold;

determining, for each selected LAC, an estimated LAC location of the selected LAC using the set of geographic locations;

associating each selected LAC with the estimated LAC location based on the determining; and providing at least one selected LAC and the estimated LAC location associated with the at least one selected LAC to a second mobile device for estimating a current location of the second mobile device.

9. The system of claim 8, where the geographic locations comprise an altitude coordinate.

10. The system of claim 8, where selecting the LAC comprises:

ranking the at least one LAC based on the estimated size of the LAC; and selecting LACs that are top-ranked.

11. The system of claim 8, where the geographic locations comprise latitude and longitude coordinates.

12. The system of claim 8, where determining the estimated LAC location comprises:

calculating an average geographic location using the set of locations;

calculating distances between the average geographic location and locations in the set;

excluding at least one geographic location from the set based on a distance between the average geographic location and the at least one location;

repeating the operations of calculating the average geographic location, calculating the distances, and excluding at least one geographic location until an exit condition is satisfied; and designating as the LAC location a circle having the average geographic location as a center and a radius based on at least one calculated distance.

13. The system of claim 12, where the exit condition is satisfied when a number of repetitions reach a threshold number.

14. The system of claim 12, where excluding the at least one location from the set includes:

determining a threshold distance to the average geographic location within which a percentage of the locations in the set are located; and excluding the at least one location from the set when the distance between the average geographic location and the at least one location exceeds the threshold distance.

15. A computer program product tangibly stored on a non-transitory storage device, operable to cause data processing apparatus to perform operations comprising:

receiving, from a set of first mobile device:

at least one location area code (LAC) of a cellular communications network, wherein each LAC is associated with a unique location area;

cell identifiers of the cellular communication network; and a set of geographic locations of the set of first mobile devices, each of the geographic locations corresponding to one of the first mobile devices;

calculating an estimated size of the location area of each received LAC, the estimated size being represented as a number of cells included in the location area, wherein the estimated number of cells is determined based on the cell identifiers received from the set of first mobile devices;

selecting at least one LAC based on the estimated size of the location area of the LAC reaching or exceeding a specified threshold;

determining, for each selected LAC an estimated LAC location of the selected LAC using the set of geographic locations;

associating each selected LAC with the estimated LAC location based on the determining; and providing at least one selected LAC and the estimated LAC location associated with the at least one selected LAC to a second mobile device for estimating a current location of the second mobile device.

16. The product of claim 15, where the geographic locations comprise an altitude coordinate.

17. The product of claim 15, where selecting the LAC comprises:

ranking the at least one LAC based on the estimated size of the LAC; and selecting LACs that are top-ranked.

18. The product of claim 15, where the geographic locations comprise latitude and longitude coordinates.

19. The product of claim 15, where determining the estimated LAC location comprises:

calculating an average geographic location using the set of locations;

calculating distances between the average geographic location and locations in the set;

excluding at least one geographic location from the set based on a distance between the average geographic location and the at least one location;

repeating the operations of calculating the average geographic location, calculating the distances, and excluding at least one geographic location until an exit condition is satisfied; and designating as the LAC location a circle having the average geographic location as a center and a radius based on at least one calculated distance.

20. The product of claim 19, where the exit condition is satisfied when a number of repetitions reach a threshold number.

21. The product of claim 19, where excluding the at least one location from the set includes:

determining a threshold distance to the average geographic location within which a percentage of the locations in the set are located; and excluding the at least one location from the set when the distance between the average geographic location and the at least one location exceeds the threshold distance.

* * * * *

UNITED STATES PATENT AND TRADEMARK OFFICE
CERTIFICATE OF CORRECTION

PATENT NO. : 8,655,371 B2
APPLICATION NO. : 12/688805
DATED : February 18, 2014
INVENTOR(S) : Ronald Keryuan Huang Page 1 of 1

It is certified that error appears in the above-identified patent and that said Letters Patent is hereby corrected as shown below:

On Title Page 3, Item (56), Other Publications, column 1, line 1, delete "Broadbank" and insert -- Broadband --.

In the Claims

In Claim 15, column 28, line 50, delete "device:" and insert -- devices: --, therefor.

Signed and Sealed this
Nineteenth Day of August, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,655,371 B2 | Page 1 of 1 |
| APPLICATION NO. | : 12/688805 | |
| DATED | : February 18, 2014 | |
| INVENTOR(S) | : Ronald K. Huang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

Signed and Sealed this
Thirteenth Day of October, 2015

Michelle K. Lee
*Director of the United States Patent and Trademark Office*